United States Patent
Ishii et al.

(10) Patent No.: US 8,631,730 B2
(45) Date of Patent: Jan. 21, 2014

(54) APPARATUS FOR CUTTING AND EJECTING NOODLES, AND NOODLE SCRAPER

(75) Inventors: Yuji Ishii, Kusatsu (JP); Yasumasa Kawamura, Kusatsu (JP); Mitsuru Tanaka, Otsu (JP)

(73) Assignee: Nissin Foods Holdings Co., Ltd., Osaka-shi (JP)

( * ) Notice: Subject to any disclaimer, the term of this patent is extended or adjusted under 35 U.S.C. 154(b) by 0 days.

(21) Appl. No.: 13/228,844

(22) Filed: Sep. 9, 2011

(65) Prior Publication Data

US 2012/0064187 A1 Mar. 15, 2012

Related U.S. Application Data

(62) Division of application No. 12/994,380, filed as application No. PCT/JP2009/005304 on Oct. 9, 2009, now Pat. No. 8,176,820.

(30) Foreign Application Priority Data

Oct. 11, 2008 (JP) ................................. 2008-264700

(51) Int. Cl.
*B26B 3/00* (2006.01)
*A21C 11/24* (2006.01)

(52) U.S. Cl.
USPC ............... 83/143; 425/306; 30/134; 99/450.2

(58) Field of Classification Search
USPC .......... 83/134, 299, 450.2; 425/306; 426/496, 426/502, 503, 521, 518, 887; 30/299; 99/450.2, 353–355, 484, 450.1; 422/194, 294, 336
See application file for complete search history.

(56) References Cited

U.S. PATENT DOCUMENTS

| 740,201 A | 9/1903 | Stimpson |
| 2,329,708 A * | 9/1943 | Fetterman ................... 56/400.13 |

(Continued)

FOREIGN PATENT DOCUMENTS

| CN | 2030014 U | 1/1989 |
| CN | 2134058 Y | 5/1993 |

(Continued)

OTHER PUBLICATIONS

Notice of Allowance in corresponding Russian Application No. 2010151726, mailed Sep. 14, 2011.

(Continued)

*Primary Examiner* — Ghassem Alie
(74) *Attorney, Agent, or Firm* — Knobbe Martens Olson & Bear LLP

(57) ABSTRACT

A noodle scraper including a plate body having a bent section extending along a longitudinal direction; a plurality of first scraping tines having a longest tine-length; and a plurality of second scraping tines having a tine-length which is shorter than that of the first scraping tine, wherein the plurality of first and second scraping tines are alternately provided at one of the long sides of the plate body in a comb form; the second scraping tine including a tine-base or tine-middle section; and the tine-base or tine-middle section is formed in a folded or curved shape, a tine-edge section of the first or second scraping tine including a face that is sloped in a vertical cross-section orthogonal to a direction in which the tine-edge section extends.

6 Claims, 19 Drawing Sheets

(56) References Cited

U.S. PATENT DOCUMENTS

| | | | |
|---|---|---|---|
| 3,033,064 A | | 5/1962 | Lee |
| 3,516,315 A | | 6/1970 | Suzuki |
| 4,072,454 A | | 2/1978 | Jen-Shuy |
| 4,176,417 A | * | 12/1979 | Ruff .................................. 7/161 |
| 5,099,638 A | * | 3/1992 | Bass ........................... 56/400.16 |
| 5,509,259 A | * | 4/1996 | Milbury ..................... 56/400.04 |
| 7,546,789 B2 | | 6/2009 | Reddell et al. |

FOREIGN PATENT DOCUMENTS

| | | |
|---|---|---|
| CN | 2909846 Y | 6/2007 |
| DE | 476332 C | 5/1929 |
| DE | 604115 | 10/1934 |
| JP | 30-3036 B1 | 5/1955 |
| JP | 48-56876 A | 8/1973 |
| JP | 55-34648 B2 | 9/1980 |
| JP | 63-45903 Y2 | 11/1988 |
| JP | 4-41582 B2 | 7/1992 |
| JP | 4-38714 Y2 | 9/1992 |
| JP | A-06-178643 | 6/1994 |
| JP | 10-210924 A | 8/1998 |
| JP | 3746087 B2 | 2/2006 |
| RU | 2061379 C1 | 6/1996 |
| RU | 2147278 C1 | 4/2000 |

OTHER PUBLICATIONS

Office Action in U.S. Appl. No. 12/994,380, mailed Sep. 30, 2011.
Search Report issued in European Patent Application No. 11193863.5 on Feb. 28, 2012.
Extended European Search Report issued in corresponding European Patent Application No. 09819016.8, dated May 18, 2011.
International Search Report issued in corresponding PCT Application No. PCT/JP2009/005304, mailed Jan. 19, 2010.
Office Action issued in Chinese Patent Application No. 200980100582.8 on Jan. 5, 2013.

* cited by examiner

APPARATUS FOR CUTTING AND EJECTING NOODLES, AND NOODLE SCRAPER

RELATED APPLICATIONS

This application is a divisional of U.S. patent application Ser. No. 12/994,380, filed Nov. 23, 2010, now U.S. Pat. No. 8,176,820 which is the U.S. National Phase filing under 35 U.S.C. §371 of PCT/JP2009/005304, filed Oct. 9, 2009, which designated the United States and was published in a language other than English, which claims priority under 35 U.S.C. §119(a)-(d) to Japanese Patent Application No. 2008-264700, filed Oct. 11, 2008. The contents of these applications are incorporated herein by reference in their entireties.

BACKGROUND OF THE INVENTION

1. Field of the Present Invention

The present invention relates to an apparatus for cutting and ejecting noodles cuts a band-shaped piece of dough and ejects noodles, and a noodle scraper peeling the noodles that were cut and ejected in cutting blade rolls of the apparatus, from the cutting blade rolls.

Specifically, the present invention relates a noodle scraper that increases the distance between adjacent noodles, front to back and side to side, peels the noodles from a groove section of the cutting blade rolls, prevents the noodles from being bent after the noodles are removed from the cutting blade rolls, prevents adjacent noodles from adhering to each other, and is used for producing noodles that are restorable to a liner-shape when the noodles are cooked.

2. Background Art

As a method for producing noodles, generally, a method is known in which a noodle dough is produced by mixing and kneading ingredients for producing noodles, such as a flour or starch, a noodle band is produced by rolling the dough with a predetermined thickness, the noodle band is cut and linear noodles are ejected with a predetermined thickness by use of an apparatus for cutting and ejecting noodles, and raw noodles are thereby produced.

The raw noodles are processed after required processing steps such as a cutting process or a steaming-boiling process in accordance with a configuration of finished products of a variety of noodles such as raw noodles, dry noodles, steamed noodles, or instant noodles.

In a step for producing steamed noodles and instant noodles, after noodles are cut and ejected, it is essential for the noodles to be in a steaming-boiling process.

An apparatus for cutting and ejecting noodles is substantially and continuously connected with a steaming-boiling apparatus with a noodle feeding conveyer interposed therebetween, and transfer of noodles is automated.

In a conventional apparatus for cutting and ejecting noodles, the pair of cutting blade rolls is disposed in a horizontal state or in an appropriately inclined state, and a guide pipe is provided under the cutting blade rolls.

The guide pipe extends in a direction perpendicular to a traveling direction of the noodle feeding conveyer or in a sloped direction with respect to the traveling direction.

The noodles that were cut by and ejected from the cutting blade rolls is transformed from the linear shape to the bent shape when passing through the guide pipe.

In addition, the noodles that were transformed into the bent shape are guided to the feeding conveyer disposed under the guide pipe.

The feeding conveyer transfers the noodles that are in a bent state in a perpendicular direction (vertical direction), to the steaming-boiling apparatus.

In the steaming-boiling apparatus, boiled noodles having a required bent shape are obtained (for example, reference to Japanese Examined Utility Model Application Publication No. H4-38714).

The pair of cutting blade rolls are constituted of two rolls in which a plurality of toroidal-groove sections is consecutively arrayed with a predetermined distance in a circumferential direction of each roll.

A protuberance portion that is provided at a circumferential face constitutes a cutting-edge portion, protuberance portions of the two cutting blade rolls are alternately engaged with each other.

When the two cutting blade rolls rotate due to a driving device and the noodle band passes between the two cutting blade rolls, the noodle band is cut by the protuberance portions of the two cutting blade rolls.

Namely, the pair of cutting blade rolls is a cutting device cutting the noodle band and ejecting noodles.

In addition, a noodle scraper used for producing noodles is disposed under the cutting blade rolls.

The noodle scraper is constituted of a plate body that is folded once or more so as to have an obtuse angle.

In addition, a plurality of scraping tines is provided in a comb form at one of the long sides of the noodle scraper.

The noodle scraper is disposed under the cutting blade rolls so that the scraping tines are engaged with or fitted into the toroidal-groove sections of the cutting blade rolls.

When the noodle band is cut and the noodles are ejected by use of the cutting blade rolls, that is, when cutting and ejecting are performed, in both of rolls facing each other, the cutting blade in one of the rolls shears the noodle dough (noodle band) so as to push the noodle band into a groove section in the other of the rolls. Because of this, the noodles that are formed by shearing the noodle band are set in the toroidal-groove sections.

Consequently, when a shorn face (cutting face) of the noodles that is not dried is adhered to an inner surface of the groove section, the noodles also remain in the groove section after the cutting and ejecting of the noodles, and it is difficult to remove the noodles from the cutting blade rolls so that the noodles are dropped from the cutting blade rolls.

In addition, a removal defect in that it is difficult to remove the noodles that were cut by and ejected from the cutting blade rolls occurs. Due to the removal defect, the roll rotates in a state where the noodles are brought in the roll.

As a result, the noodles are tangled around the periphery of the cutting blade rolls, and it becomes impossible to continuously operate the cutting blade rolls.

In order to solve the foregoing problem, conventionally, the above-described noodle scraper used for producing noodles is disposed under the cutting blade rolls, each scraping tine formed in the shape of the comb is engaged with or fitted into each toroidal-groove section of the cutting blade roll. Therefore, the cut-ejected noodles that were set in the toroidal-groove sections of the cutting blade rolls are peeled by use of the scraping tines while rotating the cutting blade rolls.

In this way, it is possible to smoothly remove the noodles from the cutting blade rolls so that the noodles are dropped from the cutting blade rolls in a rotating state.

The foregoing comb-formed noodle scraper is referred to as a noodle scratching plate, a scraper, or a scraping body.

In addition, the scraping tines formed in the shape of the comb is referred to as a peeling blade, a scratching blade, or a scraper.

In a conventional method for producing boiled noodles or in an apparatus for producing the same, as shown in FIG. 2, a cross-sectional face of a cutting blade of cutting blade rolls 13 and 13' has a recessed-protuberance shape in an axial direction.

In addition, the depths of the plurality of groove sections 14 and 14' are equal to each other.

The noodles have been cut and ejected by use of the foregoing cutting blade rolls 13 and 13'.

The noodle scraper used in the cutting blade rolls 13 and 13' shown in FIG. 2 has a configuration in which the tine-lengths of the scraping tines are equal to each other so as to be the shape of the comb.

In addition, in the noodle scraper as shown in FIG. 3, long scraping tines and short scraping tines have been alternately and repeatedly provided in a simple manner.

When the noodles are cut by and ejected from the cutting blade rolls 13 and 13' by use of the foregoing noodle scraper, the noodles that were cut and ejected are peeled and removed form each of the cutting blade rolls corresponding to the tine-length of the noodle scraper in a state where the noodles are aligned in line. The noodles are dropped on a noodle feeding conveyer or a guide pipe which is provided under the cutting blade rolls. The noodle feeding conveyer transports the noodles to a steaming-boiling apparatus. The noodles have been processed by a steaming-boiling process.

Because of this, when the cut-ejected noodles are simply steamed and boiled in a bundle form, adhesion or agglutination of the noodles occurs at portions between faces of the noodles which have been cut and ejected or between rolled faces of the noodles. Steaming-boiling defects and steaming-boiling insufficiency (starch gelatinization insufficiency) occur at portions at which the noodles are adhered or agglutinated.

As a result, there is a problem in that the commercial value is degraded.

In addition, when the noodles are cooked and restored, that is, when a boiling-heating cooking is performed, a defect of ravel in that the noodles do not adequately ravel, a cooking defect or the like occurs. Therefore, there is thereby a problem in that qualities of eating and texture are degraded in terms of tasting the noodles.

As a method of solving a problem of the noodles being adhered, agglutinated, or joined to each other, conventionally, bent noodles are formed by bending the cut-ejected noodles in an undulating form by use of a guide pipe, and the bent noodles are steamed and boiled (for example, reference to Japanese Examined Patent Application, Second Publication No. S30-3036 and Japanese Examined Patent Application, Second Publication No. S30-7193).

In this case, the noodles that were cut by and ejected from the cutting blade rolls are grouped so as to be separated into noodles groups for each cutting blade roll. The noodles are formed so as to become bent noodles in an undulating form in a perpendicular direction (vertical direction). Because of this, the frequency of adhesion of the noodles that are adjacent to each other is reduced.

However, the noodles that were cut by and ejected from one of the cutting blade rolls are evenly aligned in one of the cutting blade rolls, and the noodles that are adjacent to each other by a micro distance are in contact with each other at the shorn face thereof. Because of this, it is impossible to prevent adjacent noodles in the same row from adhering to each other.

Furthermore, due to a heating action caused by steaming and boiling, noodle components are changed, the bent shape of the bent noodles is fixed, an adhesion portion of the bent noodles that are adjacent to each other is agglutinated and fixed, and the bent shape becomes tight.

Consequently, the portions at which the noodles are fixed are unevenly steamed and boiled (starch gelatinization), and there is thereby a problem in that a defect of ravel in that the noodles do not adequately ravel, or a cooking defect occurs in a finished product.

Japanese Examined Patent Application, Second Publication No. S55-34648 disclose a method for continuously producing steamed noodles in which coalescence and agglutination do not occur between adjacent steamed noodles after the steaming-heating is performed.

In this method, a noodle scraper is employed, and the noodle scraper includes a long scraping tine and a short scraping tine (two lengths of scraping tine), and they are alternately arrayed.

Each of the two kinds of scraping tines of the noodle scraper is engaged with a front position or a rear position in a circumferential direction of the cutting blade rolls.

The noodles that were cut by and ejected from the cutting blade rolls are peeled and removed from each of the front position and the rear position in the circumferential direction of the cutting blade rolls.

In this way, a noodle group that was cut by and ejected from one of the cutting blade rolls is divided into two groups, that is, the noodles are divided into four noodle groups in the pair of cutting blade rolls.

Therefore, in accordance with the shape of the scraping tine of the noodle scraper, a noodle group that was cut by and ejected from one of the cutting blade rolls is divided into two groups.

Moreover, since a gap between noodles that are adjacent to each other and that were cut and ejected from the same row in one of the noodle groups expands, adjacent noodles are prevented from being coalesced or agglutinated.

In Japanese Examined Utility Model Application Publication No. S63-45903, the same technique as the technique of Japanese Examined Patent Application, Second Publication No. S55-34648 is disclosed.

In disclosure of Japanese Examined Utility Model Application Publication No. S63-45903, in order to engage the scraping tines with the front position and the rear position of the roll circumferential direction, the scraping tines are folded so that the engagement angle of a short scraping tine relative to the roll is large.

The foregoing technique is disclosed in Japanese Examined Patent Application, Second Publication No. H4-41582 and Japanese Patent Publication No. 3746087.

However, the above-described conventional arts disclose a technique in which the scraping tines of the noodle scraper are alternately folded, and positions at which the groove sections of the cutting blade rolls are engaged with the scraping tines are different from each other, and the amount of displacement between the front position and the rear position in the roll circumferential direction is too low.

Therefore, problems (1) and (2) still exist.

(1) When the noodles are peeled from the cutting blade rolls, even if a plurality of noodles is divided into each group, there is a problem in that, along with removal and dropping of the noodles from the cutting blade rolls, the noodles approach each other, and adjacent noodles are joined to or adhered to each other.

In addition, there is a problem in that a plurality of the noodle groups are disposed while being attuned to each other in accordance with a state where the plurality of noodles land on the feeding conveyer disposed under the cutting blade rolls or in accordance with the shape in which the plurality of noodle groups that were divided into a plurality of groups and were stacked in layers.

For this reason, there is a problem in that adjacent noodles are joined to or adhered to each other while all of the plurality of noodle groups have the same bent shape.

(2) In addition, since the noodles that were cut and ejected as one group are peeled from, removed from, and dropped from the cutting blade rolls while being aligned, the noodles that were cut and ejected from the same row are formed so as to have a space corresponding to one noodle size.

However, a gap between the noodles that are adjacent to each other is narrow.

Because of this, if the plurality of noodles having a narrow distance therebetween lands on the feeding conveyer while being attuned to each other, there is a problem in that the shorn faces of the noodles that are adjacent to each other in the same row are adhered to each other.

Japanese Unexamined Patent Application, First Publication No. H10-210924 specifies an angle of the scraping tine relative to the cutting blade rolls, and the distance between the front position and the rear position at which the scraping tines are engaged with the groove sections.

In this technique, the problem of the above-described (1) is improved, however, the problem of the above-described (2) is not solved.

Namely, when the noodles that were cut and ejected from the same positions in the circumferential direction of the cutting blade rolls land on the feeding conveyer while being attuned to each other, there is a problem in that the shorn faces of the noodles that are adjacent to each other are joined to or adhered to each other.

In addition, conventionally, when dry noodles, steamed noodles, instant noodles or the like are produced from raw noodles, in order to prevent the cut-ejected noodles that are adjacent to each other from being joined, agglutinated, or adhered to each other, the cut-ejected noodles are formed so as to bend in an undulating form that is forcedly stretched in a perpendicular direction (vertical direction). Furthermore, a noodle agglomeration in which the noodles are stacked in two-stage layers is formed, and portions at which adjacent noodles are adhered or in contact with each other are reduced.

However, in a method of forming the bent noodles as described above, the plurality of noodles that were cut by and ejected from one of the cutting blade rolls are periodically formed so as to be bent noodles at the identical frequency.

Because of this, in adjacent noodles of the plurality of noodle groups that are periodically cut and ejected at the identical frequency, there is a problem in that shorn faces that are adjacent to each other are further easily adhered to each other when a bending step is performed.

For this reason, adhesion-joint portions are dried while being unmodified, a fixed noodle agglomeration is formed; or, a noodle agglomeration in which the adhesion-joint portions are agglutinated is formed due to a starch gelatinization action in a starch component, which is caused by a steaming-boiling process such as steaming or boiling.

Because of the foregoing fixation and agglutination in the noodle agglomeration, a starch component is incompletely or unevenly gelatinized, a defect of ravel in that noodles do not adequately ravel when the noodles are cooked, and a defect of qualities of eating and texture such that restored noodles are tasteless occurs.

Therefore, because of the fixation and agglutination of the noodles, a commercial quality and a commercial value to be significantly degraded.

In order to solve the above-described problems, as much reduction of the adhesion of adjacent noodles as possible has been desired.

In addition, a method is disclosed in which a noodle scraper including a long scraping tine and a short scraping tine (two lengths of scraping tine) is employed; the scraping tines are alternately arrayed; each of the noodle scraper having two types of scraping tine is engaged with the front position and the rear position in the circumferential direction of one of the cutting blade rolls; and a noodle group that was cut by and ejected from the cutting blade roll is separated into two groups.

However, even if this method is employed, the noodle group that was cut and ejected from the front position is not sufficiently separated from the noodle group that was cut and ejected from the rear position.

In addition, each of four noodle groups that were cut by and ejected from two cutting blade rolls is formed so as to periodically bend at the identical frequency, the groups are stacked in layers and steamed and boiled.

Therefore, the problems of adjacent noodle groups being joined to and adhered to each other, and of adjacent noodles being joined to and adhered to each other in a single group, are not still solved.

For this reason, a problem such as the defect of ravel in a finished product still remains.

Generally, the shape of a buckwheat noodle or a wheat noodle is typically linear.

However, in a case where raw noodles that were cut and ejected are continuously processed by steaming and boiling while the linear shape thereof is maintained in order to produce a large quantity of noodles, it is necessary to prepare a heavyweight feeding conveyer or a huge steaming-boiling apparatus, and there is a problem of a disadvantage occurring in terms of space and cost.

In order to solve the problem, a method in which noodles are formed so as to be bent in a steaming-boiling step, in which and the bent noodles are stretched after the steaming-boiling step is disclosed (for example, Japanese Unexamined Patent Application, First Publication No. S48-56876).

However, in this method, it is necessary to further prepare an apparatus for stretching the noodles.

Additionally, when noodles having the same degree of strength as conventional bent noodles are formed so as to be bent by use of a method in a manner similar to cut and eject conventional bent noodles, and when and a steaming-boiling process is performed, noodle components are denatured due to steaming-heating action in the steaming-boiling process, and the bent shape of the noodles is fixed. Even if the noodles are stretched after steaming and boiling, the noodles are not returned to the shape of line, and there is a problem in that the bent shape thereof is maintained.

Consequently, in a continuous quantity production of a buckwheat noodle and a wheat noodle along with the steaming-boiling process, there is a problem in that it is difficult to produce linear noodles after cooking.

Because of this, in a provision of a buckwheat noodle and a wheat noodle having the bent shape, consumer dissatisfaction is not still solved.

SUMMARY OF THE INVENTION

The present invention solves the above-described problems by improving an apparatus for cutting and ejecting noodles and a noodle scraper used therein, and realizes the above-described object.

In order to solve the above-described problems, an apparatus for cutting and ejecting noodles of a first aspect of the present invention, includes: a pair of cutting blade rolls at which a plurality of toroidal-groove sections is formed, the cutting blade rolls cutting a noodle band and ejecting a plurality of noodles, the plurality of toroidal-groove sections having two or more depths, and the plurality of toroidal-groove sections being formed so as to be alternately or sequentially arrayed; a noodle scraper constituted of a plate body having a bent section extending along a longitudinal direction, the noodle scraper including a plurality of scraping tines formed in a comb form, the scraping tines being provided at one of long sides of the plate body and engaged with each of the toroidal-groove sections; a guide section disposed under the noodle scraper, transporting a plurality of the noodles that are dropped from the cutting blade rolls; and a feeding conveyer disposed under the guide section, the feeding conveyer feeding the plurality of noodles.

In the apparatus for cutting and ejecting noodles of the first aspect of the present invention, each scraping tine includes a tine-edge section, the plurality of tine-edge sections are engaged with the plurality of toroidal-groove sections at a front position and a rear position in a circumferential direction of the cutting blade rolls, in accordance with the depths of the toroidal-groove sections engaged with the scraping tines.

Here, the bent section is a portion at which the plate body is bent into a V-shape or is bent several times.

It is preferable that, in the apparatus for cutting and ejecting noodles of the first aspect of the present invention, the cutting blade rolls be cutting blade rolls having a square blade cutting and ejecting the noodles, and the cross-sectional shape of the noodles be tetragon.

It is preferable that, in the apparatus for cutting and ejecting noodles of the first aspect of the present invention, the plurality of toroidal-groove sections include a first groove section having a shortest depth and a second groove section having a greatest depth; the plurality of scraping tines include a first scraping tine having a longest tine-length and a second scraping tine having a tine-length which is shorter than that of the first scraping tine; and the first scraping tine be engaged with the first groove section and the second scraping tine is engaged with the second groove section.

It is preferable that, in the apparatus for cutting and ejecting noodles of the first aspect of the present invention, a plurality of first groove sections and a plurality of second groove sections be alternately disposed.

It is preferable that, in the apparatus for cutting and ejecting noodles of the first aspect of the present invention, the second scraping tine engaged with the second groove section include a tine-base section or a tine-middle section; and the tine-base section or the tine-middle section be formed in a folded shape that is folded toward a bottom portion of the second groove section, or in a curved shape.

It is preferable that, in the apparatus for cutting and ejecting noodles of the first aspect of the present invention, the tine-edge section of the first scraping tine engaged with the first groove section be formed in a folded shape that is folded toward a bottom portion of the first groove section, or in a curved shape.

It is preferable that, in the apparatus for cutting and ejecting noodles of the first aspect of the present invention, the tine-edge section of the first scraping tine include a sloped face that is sloped in a direction that is orthogonal to a direction in which the tine-edge section extends.

It is preferable that, in the apparatus for cutting and ejecting noodles of the first aspect of the present invention, the tine-edge section of the second scraping tine include a sloped face that is sloped in a direction that is orthogonal to a direction in which the tine-edge section extends.

It is preferable that, in the apparatus for cutting and ejecting noodles of the first aspect of the present invention, a position of a folded portion or a position of a curving-start portion in the tine-edge section of the first scraping tine substantially coincide with the position of an outer-peripheral face of the cutting blade rolls in height, or be disposed outward of the outer-peripheral face of the cutting blade rolls.

It is preferable that, in the apparatus for cutting and ejecting noodles of the first aspect of the present invention, the plurality of toroidal-groove sections include a first groove section having a shortest depth, a second groove section having a greatest depth, and a third groove section having a depth which is greater than that of the first groove section and is less than that of the second groove section; the scraping tines include a first scraping tine having a longest tine-length, a second scraping tine having a tine-length which is shorter than that of the first scraping tine, and a third scraping tine having a tine-length which is shorter than that of the first scraping tine and is longer than that of the second scraping tine; and the first scraping tine be engaged with the first groove section, the second scraping tine be engaged with the second groove section, and the third scraping tine be engaged with the third groove section.

It is preferable that, in the apparatus for cutting and ejecting noodles of the first aspect of the present invention, the second scraping tine include a tine-base section or a tine-middle section; and the tine-base section or the tine-middle section be formed in a folded shape that is folded toward a bottom portion of the second groove section, or in a curved shape.

It is preferable that, in the apparatus for cutting and ejecting noodles of the first aspect of the present invention, the second scraping tine and the third scraping tine include a tine-base section or a tine-middle section; the tine-base section of the second scraping tine or the tine-middle section of the second scraping tine be formed in a folded shape that is folded toward a bottom portion of the second groove section, or in a curved shape; and the tine-base section of the third scraping tine or the tine-middle section of the third scraping tine be formed in a folded shape that is folded toward a bottom portion of the third groove section, or in a curved shape.

It is preferable that, in the apparatus for cutting and ejecting noodles of the first aspect of the present invention, a folded angle or a degree of curvature of the second scraping tine engaged with the second groove section be greater than a folded angle or a degree of curvature of the third scraping tine engaged with the third groove section.

It is preferable that, in the apparatus for cutting and ejecting noodles of the first aspect of the present invention, the first scraping tine include a tine-base section or a tine-middle section; and the tine-base section or the tine-middle section be formed in a folded shape that is folded toward a bottom portion of the first groove section, or in a curved shape.

It is preferable that, in the apparatus for cutting and ejecting noodles of the first aspect of the present invention, each of the first scraping tine and the second scraping tine include a tine-base section or a tine-middle section; the tine-base section of the first scraping tine or the tine-middle section of the first scraping tine be formed in a folded shape that is folded toward a bottom portion of the first groove section, or in a curved shape; and the tine-base section of the second scraping tine or the tine-middle section of the second scraping tine be formed in a folded shape that is folded toward a bottom portion of the second groove section, or in a curved shape.

It is preferable that, in the apparatus for cutting and ejecting noodles of the first aspect of the present invention, the first groove section, the second groove section, and the third groove section be provided at the cutting blade rolls in the order where the depths thereof increase.

It is preferable that, in the apparatus for cutting and ejecting noodles of the first aspect of the present invention, the first groove section, the second groove section, and the third groove section are provided at the cutting blade rolls in a predetermined order.

It is preferable that, in the apparatus for cutting and ejecting noodles of the first aspect of the present invention, the tine-edge section of the first scraping tine include a sloped face that is sloped in a direction that is orthogonal to a direction in which the tine-edge section extends.

It is preferable that, in the apparatus for cutting and ejecting noodles of the first aspect of the present invention, the tine-edge section of the second scraping tine or the third scraping tine include a sloped face that is sloped in a direction that is orthogonal to a direction in which the tine-edge section extends.

It is preferable that, in the apparatus for cutting and ejecting noodles of the first aspect of the present invention, a position of a folded portion or a position of a curving-start portion in the tine-edge section of the first scraping tine substantially coincide with the position of an outer-peripheral face of the cutting blade rolls in height, or be disposed outward of the outer-peripheral face of the cutting blade rolls.

It is preferable that, in the apparatus for cutting and ejecting noodles of the first aspect of the present invention, the guide section have a width corresponding to a width of the cutting blade rolls; the guide section be provided so as to be downwardly inclined with respect to a transfer direction of the noodles fed by the feeding conveyer; and the guide section and an upside portion between the guide section and the feeding conveyer be opened.

A noodle scraper of a second aspect of the present invention, includes a plate body having a bent section extending along a longitudinal direction; a plurality of first scraping tines having a longest tine-length; and a plurality of second scraping tines having a tine-length which is shorter than that of the first scraping tine.

In the noodle scraper of the second aspect of the present invention, the plurality of first scraping tines and the plurality of second scraping tines are alternately provided at one of long sides of the plate body in a comb form; the second scraping tine includes a tine-base section or a tine-middle section; and the tine-base section or the tine-middle section is formed in a folded shape or a curved shape.

It is preferable that, in the noodle scraper of the second aspect of the present invention, a tine-edge section of the first scraping tine be formed in a folded shape or a curved shape.

It is preferable that, in the noodle scraper of the second aspect of the present invention, a tine-edge section of the first scraping tine or a tine-edge section of the second scraping tine include a sloped face that is sloped in a direction that is orthogonal to a direction in which the tine-edge section extends.

A noodle scraper of a third aspect of the present invention, includes a plate body having a bent section extending along a longitudinal direction; a plurality of first scraping tines having a longest tine-length; a plurality of second scraping tines having a tine-length which is shorter than that of the first scraping tine; and a plurality of third scraping tine having a tine-length which is shorter than that of the first scraping tine and is longer than that of the second scraping tine.

In the noodle scraper of the third aspect of the present invention, the plurality of first scraping tines, the plurality of second scraping tines, and the plurality of third scraping tines are alternately provided at one of long sides of the plate body in a comb form; the second scraping tine and the third scraping tine include a tine-base section or a tine-middle section; and the tine-base section or the tine-middle section is formed in a folded shape or a curved shape.

It is preferable that, in the noodle scraper of the third aspect of the present invention, the plurality of first scraping tines, the plurality of second scraping tines, and the plurality of third scraping tines be arrayed in the order where the depths thereof increase; only tine-edge section of the first scraping tine, or a tine-edge section of the first scraping tine and the third scraping tine be formed in a folded shape or a curved shape.

It is preferable that, in the noodle scraper of the third aspect of the present invention, a tine-edge section of the first scraping tine, a tine-edge section of the second scraping tine, or a tine-edge section of the second scraping tine include a sloped face that is sloped in a direction that is orthogonal to a direction in which the tine-edge section extends.

In both the apparatus for cutting and ejecting noodles and the noodle scraper related to the present invention, the noodles are peeled from the cutting blade rolls, and the distance between noodles that are adjacent to each other, front to back and side to side, sufficiently increases.

Consequently, adjacent noodles are prevented from being joined to or adhered to each other at the shorn face of the noodles.

Furthermore, in a steaming-boiling step, the noodles are prevented from being joined to, agglutinated to, and adhered to each other.

In addition, in both the apparatus for cutting and ejecting noodles and the noodle scraper related to the present invention, since the sloped face is formed at the first scraping tine engaged with the first groove section, it is possible to change the direction in which the noodles peeled by the sloped face is removed, from the direction that is orthogonal to a direction in which the tine-edge section extends.

For this reason, in the case where a noodle group peeled by the sloped face and a noodle group peeled by the second scraping tine engaged with the second groove section are stacked in layers, portions at which the noodles are in contact with each other are limited to points at which the noodles intersect with each other.

Namely, the plurality of noodles are stacked in layers while being in contact with each other at points thereof.

Therefore, the number of contact and adhesion portions which are caused by a line contact or a surface contact drastically decreases; joining, adhesion, and agglutination are comprehensively prevented; and it is thereby possible to solve conventional problems.

In addition, in both the apparatus for cutting and ejecting noodles and the noodle scraper related to the present invention, a direction in which the noodles that were cut by and ejected from the cutting blade rolls are removed is converted into an oblique direction, and a displacement force occurs such that the noodles rotates; therefore, a torsional action occurs in the noodles.

For this reason, when the plurality of noodles are peeled in a line, the contact faces of the noodles in the line are three-dimensionally displaced in different directions.

In this way, it is possible to prevent the plurality of noodles peeled from the first groove section from adhering to each other.

In addition, also, when the noodle groups are stacked in layers based on the difference between the plurality of scraping tines in the noodle scraper, due to the difference between the scraping directions of each of the groups, it is possible to further reduce the number of points at which the noodle group peeled from the second groove section is in contact with the noodle group peeled from the first groove section.

Therefore, it is possible to comprehensively prevent the noodles from being joined to, adhered to, and agglutinated to each other.

In addition, in both the apparatus for cutting and ejecting noodles and the noodle scraper related to the present invention, since the sloped face is formed at the plurality of scraping tines, a removing direction in which the noodles are removed from the cutting blade rolls is converted into a direction oblique to a direction in which the scraping tine extends.

In addition, a force of converting the removing direction as mentioned above, a force of ejecting the noodles which is caused by a rotation force of the cutting blade rolls, a force of dropping the noodles which is caused by own weight of the noodles that were removed from the cutting blade rolls, or the like are synergistically operated; the noodles that were cut by and ejected from the cutting blade rolls are dropped from the cutting blade rolls so as to form a three-dimensional spiral shape.

Consequently, it is possible to form the structure of the noodles that land on the guide section into a continuous spiral configuration while displacing a phase of curved noodles that have a predetermined period.

Because of this, it is possible to stack the plurality of noodles in layers while folding the noodles in a relatively large region.

For this reason, since it is possible to steam and boil the noodle groups while maintaining a high level of linearity and air space rate of the noodle groups, it is possible to prevent the noodles from being bent due to steaming and boiling.

Furthermore, since the number of contact points at which adjacent noodles are in contact with each other dramatically decreases, the contact points easily ravel out during cooking.

Therefore, it is possible to restore the cooked noodles to a linear shape that is similar to the shape of the cut and ejected noodles.

In addition, as described above, the noodle group that is stacked in layers in a spiral manner are stacked on a noodle group that landed and deposited in a zig-zag manner or on a noodle group that landed and deposited in a wavy manner.

Consequently, since the noodles are in contact with each other at points at which the plurality of noodles three-dimensionally intersect with each other, line contact or surface contact is prevented in the noodles.

Because of this, the plurality of contact points that occur between the noodle groups which have different three-dimensional structures, which is caused by stacking the plurality of noodles in layers, are randomly and widely distributed.

For this reason, the number of the contact points can be drastically decreased, and it is possible to prevent the plurality of noodles from being joined to, agglutinated to, and adhered to each other in a steaming-boiling step.

In addition, in both the apparatus for cutting and ejecting noodles and the noodle scraper related to the present invention, the plurality of noodles are peeled by the scraping tine while being in contact with the sloped face along with the rotation of the cutting blade rolls, and are removed from the groove section.

At this time, the direction at which the noodles are removed is converted into the oblique direction along the sloped face, and the noodles are ejected.

In addition, since displacement of the noodles occurs which is caused by a torsional action and a rotation action in the noodles, the noodles that were peeled by the sloped face fall in a spiral manner; the noodles are stacked on an upper face of the guide section or on a top portion of the noodle group that arrived in advance at the upper face of the guide section.

In addition, the noodle groups falling in a spiral manner are stacked and deposited in layers while shifting a phase thereof.

Consequently, in any of the noodle group that was cut and ejected from the same row or and the other noodle groups, the number of portions at which the noodles are adhered to each other is reduced, the noodles are prevented from being adhered to and agglutinated to each other in a steaming-boiling process.

As a result, it is possible to solve both the cooking defect and the defect of ravel which are caused by adhering the noodles in a finished product.

In addition, in both the apparatus for cutting and ejecting noodles and the noodle scraper related to the present invention, since the noodles are cut by and ejected from the pair of cutting blade rolls, the noodle groups that are eventually stacked in layers on the guide section have a structure in which the noodle groups that are stacked in a spiral manner are sandwiched between the noodle groups that are stacked in a zig-zag manner or in a wavy manner.

In addition, in the apparatus for cutting and ejecting noodles related to the present invention, the guide section that is inclined relative to a direction in which the noodles are fed by the feeding conveyer is employed.

Here, the guide section includes a guide shoot, a guide plate, or a guide pipe.

Hereinafter, the guide section is optionally referred to as a guide shoot or the like.

Here, if the guide section is the guide pipe, the guide pipe has a structure in which the noodles are not forcedly bent.

The foregoing guide section opens at the upside portion between the feeding conveyer and the guide section, toward the transfer direction in which the noodles are transported by the feeding conveyer.

For this reason, the shape of the noodles is prevented from being fixed while being formed in a bent manner, and the effect of the linearity of noodles being maintained is obtained.

Furthermore, in the apparatus for cutting and ejecting noodles related to the present invention, the noodle groups are cut by and ejected from the first groove section and the second groove section and at the front position and the rear position in the circumferential direction of the cutting blade rolls.

Comparing the noodle group that was cut by and ejected from the first groove section with the noodle group that was cut by and ejected from the second groove section, the shapes of the noodles that are dropped toward the guide section from the cutting blade rolls are different from each other.

Consequently, in each of the noodle groups that were cut by and ejected from the first groove section and the second groove, noodle conditions or noodle structures are different from each other at the time when the noodle groups land on the guide section, based on differences between the shapes of the noodles.

The noodle groups that were cut by and ejected from the first groove section and the second groove are stacked in layers in a vertical direction on the guide section.

The guide section smoothly transports the noodle groups and can allow the noodle groups to be stably moved on the feeding conveyer while maintaining the shape of the noodle groups that are stacked in layers as mentioned above.

Therefore, the shape of the noodle groups that were cut by and ejected from the first groove section and the second groove and that are stacked in layers becomes a random three-dimensional structure, and the three-dimensional structure is maintained.

Because of this, it is possible to considerably eliminate the number of joint points at which the noodle group that was cut by and ejected from the first groove section and the second groove are adhered to each other.

Therefore, in a steaming-boiling step in which the noodle groups that are stacked in layers in the above-described manner are steamed and boiled, it is possible to prevent adjacent noodles from being joined to, agglutinated to, and adhered to each other.

In addition, in the guide section of the apparatus for cutting and ejecting noodles related to the present invention, a portion between the cutting blade rolls and the guide section and a portion between the feeding conveyer and the guide section are opened.

Consequently, a facing plate is not provided, and the facing plate suppressing or interfering with an action in which the noodles that were cut by and ejected from the first groove section are peeled and removed in a direction oblique to the direction in which the noodles are dropped.

For this reason, in a further large region, it is possible to occur a removal action (movement) in the oblique direction.

Thus, the region in which the three-dimensional layered structure constituted of the plurality of noodle groups is formed is expanded, and it is possible to dramatically eliminate the number of contact portions at which adjacent noodles are in contact with each other.

In addition, in the guide section of the apparatus for cutting and ejecting noodles related to the present invention, when the noodles land on the shoot or the plate, the distance between adjacent noodles in a vertical direction and from side to side increases, variations in the distance increases, the contact portions at which the plurality of noodles are in contact with each other are randomly distributed, and it is also possible to reduce the number of contact portions.

In addition, in the noodle scraper related to the present invention, a plurality of scraping tines with different tine-lengths is provided.

The plurality of scraping tines are engaged with positions that are different from each other in the circumferential direction of the cutting blade rolls in accordance with the front position and the rear position.

Because of this, in noodle groups that were cut, ejected, and peeled from the cutting blade rolls, the noodles are peeled and removed from the cutting blade rolls while corresponding to the array of the scraping tines.

Therefore, it is possible to increase the distance between the front position and the rear position or the distance between noodles adjacent to each other, more than with conventional noodle scrapers.

Therefore, it is possible to prevent joining, adhesion, agglutination, or the like in the plurality of noodle groups.

In addition, in both the apparatus for cutting and ejecting noodles and the noodle scraper related to the present invention, since the above-described constitution and effect are obtained, it is possible to prevent a variety of noodles from adhering to each other.

Specifically, not only in the case of producing the noodles to be in a steaming-boiling process but also in a case of producing raw noodles without the steaming-boiling process, or in a case where a heat-treatment such as a boiling treatment is performed, it is possible to prevent noodles from adhering to each other.

DESCRIPTION OF THE PREFERRED EMBODIMENTS

Hereinafter, embodiments of an apparatus for cutting and ejecting noodles and a noodle scraper related to the present invention will be explained with reference to drawings.

In explanation below, noodles are a processed food which is formed into a linear shape, in which flour such as cereal, rice, wheat, buckwheat, or beans is used as a main ingredient, which is cooked by boiling or steaming.

In addition, noodles represent noodles that are obtained by mechanically cutting a noodle band and by ejecting in an apparatus for cutting and ejecting noodles, and represent a variety of noodles that belong in a "cut noodle category".

In the "cut noodle category", by use of a cutting blade, the noodle is processed by linearly cutting a thin noodle dough that was thinly expanded.

The foregoing noodles are obtained by a technique of producing noodles by use of a mechanized production line.

The foregoing technique of producing noodle is not limited to a technique employed in a general noodle-producing factory, and is used in a small size shop such as a wheat noodle shop or a buckwheat noodle shop.

In addition, the noodles in the present invention is not limited to wheat noodles or buckwheat noodles.

The noodles in the present invention are processed noodles by kneading a material including the above-described main ingredient, by obtaining a band-shaped noodle band, and by cutting and separating the noodle band; the noodles were cut and separated by use of the apparatus for cutting and ejecting noodles of the present invention.

First Embodiment

Figure 1:
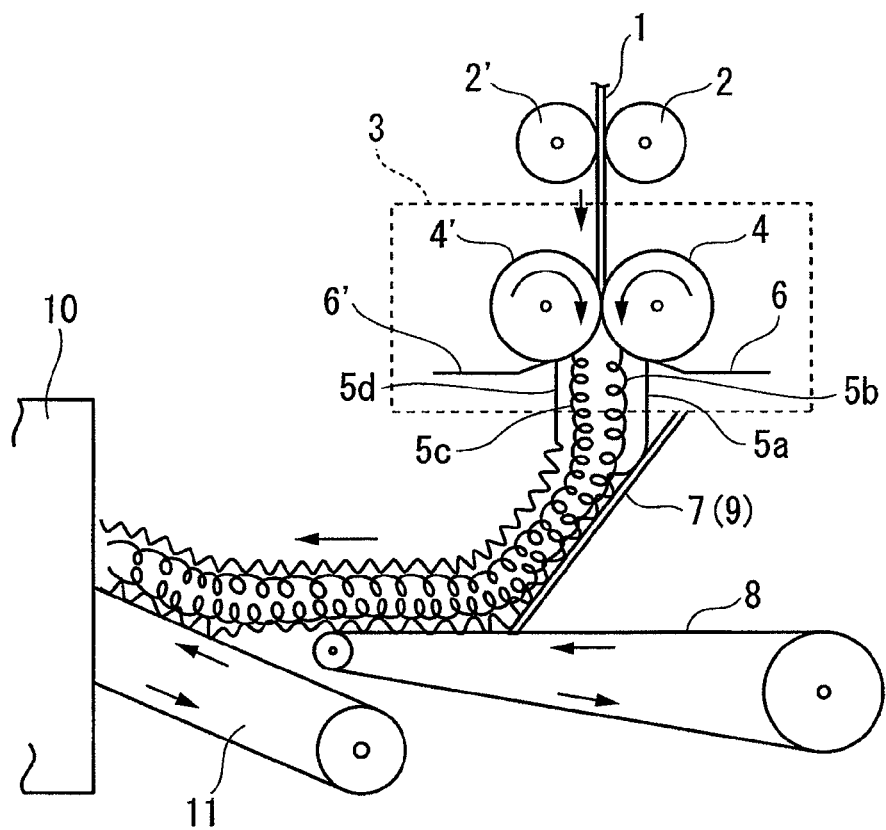
FIG. 1 is a side view schematically showing an apparatus for cutting and ejecting noodles related to the present invention, and illustrating a step before a step of cutting and ejecting noodles and a step after the step of cutting and ejecting noodles.

FIG. 1 is a side view schematically showing an apparatus for cutting and ejecting noodles related to the present invention, illustrating a step previous to a step of cutting and ejecting noodles, a step after the step of cutting and ejecting noodles, and a state where the noodles are processed and transferred.

Firstly, a noodle dough is obtained by mixing and kneading general noodle-production ingredients, such as flour or starch, by use of a known method.

Subsequently, the noodle dough is rolled and passed through gaps of several rolled rolls, and a band-shaped noodle band is obtained.

The gap between final rolled rolls 2 and 2' is adjusted so as to form a noodle band having a predetermined thickness.

The noodle band 1 that was passed through the gap of the rolled rolls 2 and 2' is passed through a gap between the pair of cutting blade rolls 4 and 4' of an apparatus 3 for cutting and ejecting noodles.

Each of the pair of cutting blade rolls 4 and 4' has a plurality of toroidal-groove sections.

Consequently, the noodle band 1 is cut and ejected as a plurality of noodles 5a to 5d by the plurality of toroidal-groove sections while passing through the gap between the cutting blade rolls 4 and 4'.

Noodle scrapers 6 and 6' are disposed under each of the cutting blade rolls 4 and 4'

The noodle scrapers 6 and 6' have a plurality of scraping tines (described below) that are engaged with or fitted into each of the toroidal-groove sections (not shown) of the cutting blade rolls 4 and 4'.

In addition, the plurality of scraping tines includes scraping tines having a plurality of lengths, that is, having different lengths different from each other.

The noodles 5a, 5b and 5c, and 5d that were cut by and ejected from the cutting blade rolls 4 and 4' are peeled at predetermined peeling position (a front position or a rear position) in a circumferential direction of the cutting blade rolls 4 and 4' by the noodle scrapers 6 and 6'.

In addition, the noodles 5a, 5b and 5c, and 5d are dropped from the cutting blade rolls 4 and 4' such that the positions at which the noodles are peeled are different from each other in the front position or the rear position thereof.

In other words, the cut-ejected noodles 5a, 5b and 5c, and 5d are peeled at predetermined peeling positions in accordance with the lengths of the scraping tines, namely, depending on the position of a long scraping tine or a short scraping tine.

Because of this, the cut-ejected noodles 5a, 5b and 5c, and 5d are separated into each other in accordance with peeling positions of two rows as front and rear rows at each of the cutting blade rolls 4 and 4' and are dropped therefrom.

A guide shoot or the like 7 (9) that is a guide section of the present invention is arranged under the cutting blade rolls 4 and 4'.

The guide shoot or the like 7 (9) has a sloped face that is inclined with respect to a direction in which the cut-ejected noodles 5a, 5b and 5c, and 5d are dropped.

In other words, the guide shoot or the like 7 (9) has the sloped face that is inclined with respect to a direction in which the noodles fed by a noodle feeding conveyer 8 are transferred.

In the guide shoot or the like 7 (9), an upper edge of the sloped face is positioned under the cutting blade rolls 4 or the noodle scraper 6, and a lower edge of the sloped face is positioned above a feeding face of the noodle feeding conveyer 8 (feeding conveyer).

The noodle feeding conveyer 8 is disposed under the guide shoot or the like 7 (9).

The noodles 5a, 5b and 5c, and 5d that were cut by and ejected from the cutting blade rolls 4 and 4' reach the sloped face of the guide shoot or the like 7 (9), the plurality of noodle groups are sequentially stacked in layers on the sloped face of the guide shoot or the like 7 (9), and the plurality of noodle groups are transported while being dropped downward along the sloped face of the guide shoot or the like 7 (9).

The plurality of noodle groups that were stacked in layers are transported from the guide shoot or the like 7 (9) to the noodle feeding conveyer 8.

The layered noodle groups 5a, 5b and 5c, and 5d that were transported by the noodle feeding conveyer 8 are transported from the noodle feeding conveyer 8 to a steaming-boiling conveyer 11.

The layered noodle groups 5a, 5b and 5c, and 5d are transferred to the steaming-boiling conveyer 11 and transported into a steaming-boiling apparatus 10, and are processed by, for example, steaming or boiling in the steaming-boiling apparatus 10.

Figure 21:
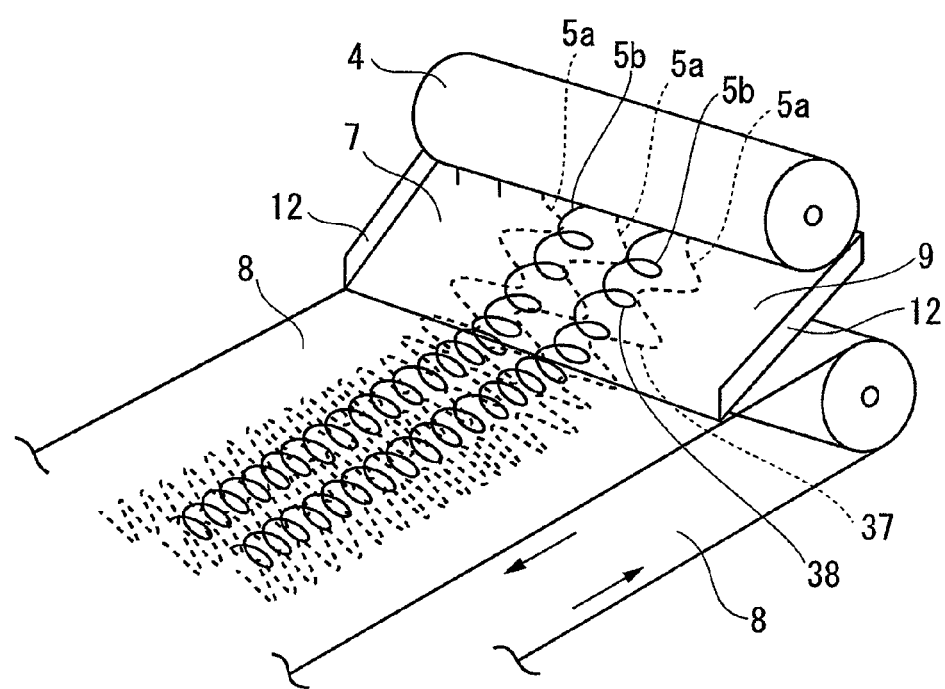
FIG. 21 is a perspective view schematically showing a state where the plurality of noodles that were cut and ejected by the apparatus for cutting and ejecting noodles related to the present invention are deposited, the configuration of a plurality of noodles stacked in layers, and the state in which the plurality of noodles are transported.

As shown in FIG. 21, the guide shoot 7 has a guide plate 9 that transports the noodles that were cut by and ejected from the cutting blade rolls 4 and 4'(reference numeral 4' is not shown in the drawing) to the noodle feeding conveyer 8, and side plates 12 that prevent the noodles from deviating to a side of the production line, and is formed as a shoot shape.

The size of the side plates 12 can be appropriately adjusted and controlled.

The plates 12 may be omitted if necessary.

In addition, the guide shoot 7 is downwardly inclined with respect to the direction in which the noodles are transported by the feeding conveyer 8, and serves as a sliding way that causes the cut-ejected noodles 5a to 5d to slide.

Each of the cutting blade rolls 4 and 4' the pair of cutting blade rolls shown in FIG. 1 is a so-called square cutting blade rolls, and is employed to cut and eject the noodles whose cross-sectional shape is square.

The toroidal-groove sections of the cutting blade rolls 4 and 4' include a plurality of grooves having at least two or more depths, that is, a plurality of first groove sections having a shortest depth and a plurality of second groove sections having a greatest depth.

The foregoing plurality of first groove sections and second groove sections are alternately, repeatedly, and consecutively arrayed in accordance with a difference between depths.

In addition, in a case where the toroidal-groove sections of the cutting blade rolls 4 and 4' include a plurality of grooves having three or more depths, the toroidal-groove sections of the cutting blade rolls 4 and 4' includes third groove sections having a depth which is greater than that of the first groove section and less than that of the second groove section in addition to the first grooves groove section and the second groove section.

In this case, the plurality of first grooves, second grooves, and third grooves are repeatedly arrayed at the cutting blade rolls 4 and 4' so that the depths thereof are different from each other in a sequential manner.

In a case where the first grooves, the second grooves, and the third grooves are not arranged so that the depths thereof are different from each other in a sequential manner, the first grooves, the second grooves, and the third grooves may be repeatedly arrayed in order in accordance with an appropriate arrangement.

In addition, in the embodiment, round cutting blade rolls may be employed instead of the square cutting blade rolls.

In addition, not only the case of having the first grooves, the second grooves, and the third grooves, but also the cutting blade rolls 4 and 4' may have four or more grooves including fourth grooves having a depth greater than that of the third grooves.

Figure 2:
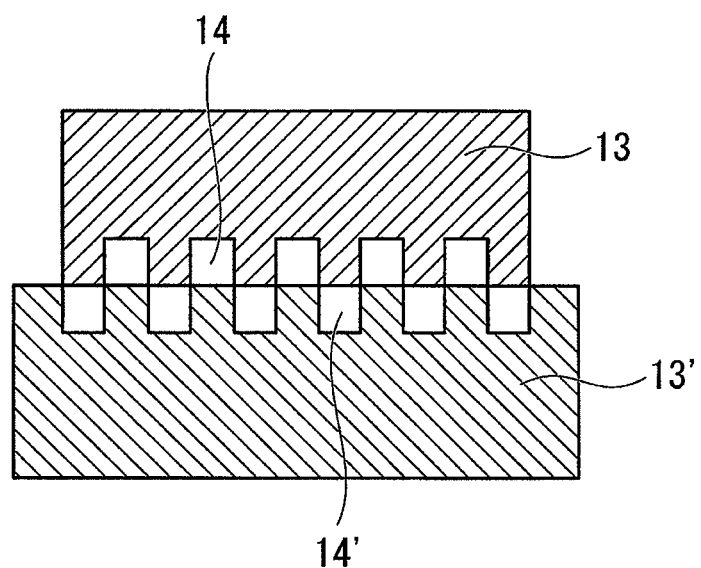
FIG. 2 is a cross-sectional view schematically showing conventional square cutting blade rolls, and is a vertical cross-sectional view showing the square cutting blade rolls in an axial line.

FIG. 2 is a cross-sectional view schematically showing conventional square cutting blade rolls, and is a vertical cross-sectional view showing the square cutting blade rolls in an axial line.

In the foregoing conventional square cutting blade rolls, each of the cutting blade rolls has a plurality of toroidal-groove sections which all have the same depth.

A general noodle scraper 15 that is engaged with the cutting blade rolls 13 and 13' has a plurality of scraping tines 16 which all have the same length, the scraping tines 16 being formed as comb form.

Figure 3:
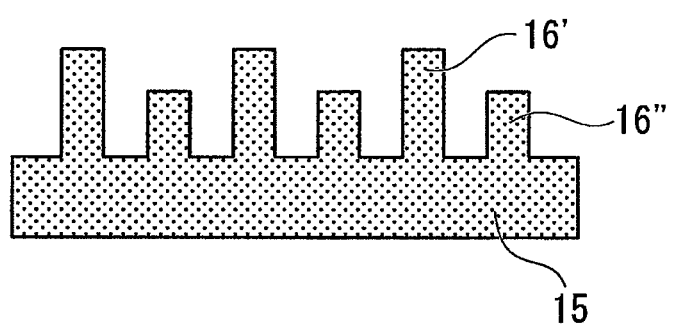
FIG. 3 is a view showing a conventional noodle scraper, and is a plan view schematically showing a noodle scraper in which long scraping tines and short scraping tines are alternately arrayed.

For example, as shown in FIG. 3, a structure in which long scraping tines 16' and short scraping tines 16" are alternately arrayed is well-known and is a reference to Japanese Examined Patent Application, Second Publication No. S55-34648.

Figure 18:
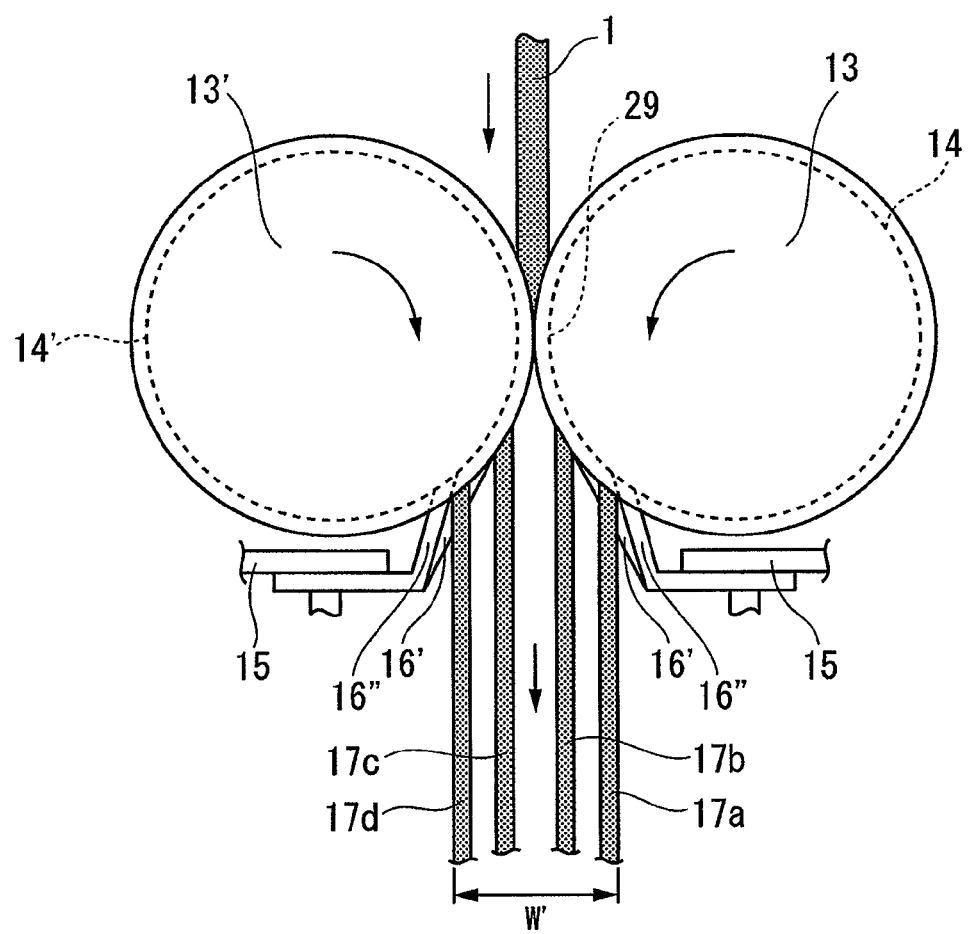
FIG. 18 is a side view schematically illustrating a state where the noodles are continuously cut and ejected in a conventional apparatus for cutting and ejecting noodles.

When a noodle band is cut and ejected by use of the conventional noodle scraper 15 shown in FIG. 3, cut-ejected noodles 17a to 17d are separated into two groups and dropped from each of the cutting blade rolls 13 and 13' as shown in FIG. 18.

However, the depths of groove sections 14 in the cutting blade rolls 13 and 13' are formed by one depth, and the cutting blade rolls 13 and 13' are formed with one groove.

Furthermore, the groove section 14 that is one groove is relatively shallow.

Because of this, the separation width W' of all of four groups 17a to 17d is narrow.

For this reason, movements of the plurality of noodles that were cut by and ejected from the cutting blade rolls 13 and 13' attuned to each other; when the plurality of noodles are dropped from the cutting blade rolls 13 and 13', the plurality of noodles that are adjacent to each other, front to back and side to side, are easily adhered to each other in a multifaceted manner.

When the plurality of noodles reach a noodle feeding conveyer disposed under the cutting blade rolls 13 and 13', if the plurality of noodles that are adjacent to each other are stacked in layers while being adhered to each other in a multifaceted manner, the plurality of noodles are adhered to and agglutinated to each other in a steaming-boiling process, and baleful defects thereby occur.

Therefore, conventionally, it is impossible to prevent the foregoing defects, and the plurality of noodles that are adjacent to each other are not sufficiently-separated from each other.

Figure 4:
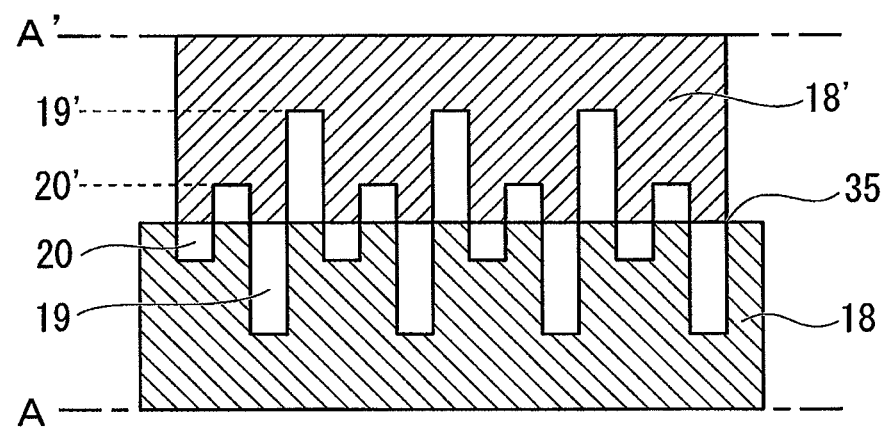
FIG. 4 is a cross-sectional view schematically showing cutting blade rolls of an apparatus for cutting and ejecting noodles related to the present invention shown in FIG. 19, and is a vertical cross-sectional view showing the cutting blade rolls in the axial lines A and A'.

In contrast, as shown in FIG. 4, the toroidal-groove sections of the cutting blade rolls 18 and 18' related to the present invention are composed of the plurality of grooves, that is, two grooves constituted of deep grooves 19 and 19' (second groove section and toroidal-groove section) and shallow grooves 20 and 20' (first groove section and toroidal-groove section).

The plurality of deep grooves 19 and 19' and the plurality of shallow grooves 20 and 20' are alternately and sequentially arrayed.

Figure 5:
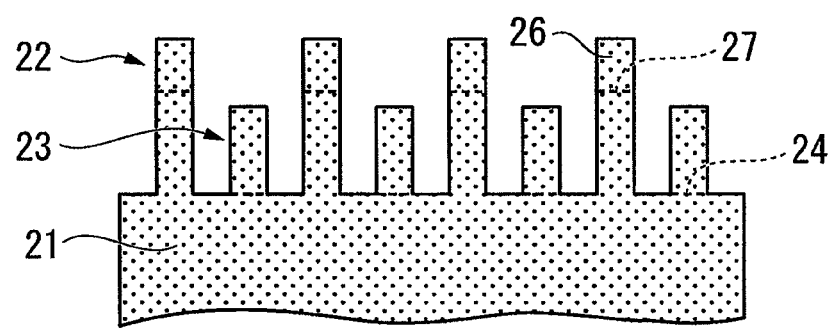
FIG. 5 is a plan view schematically showing a noodle scraper related to the present invention.

In addition, as shown in FIG. 5, a noodle scraper 21 related to the present invention has long scraping tines 22 (a first scraping tine) and short scraping tines 23 (a second scraping tine), and is thereby constituted of the scraping tines having two tine-lengths that are long-length and short-length.

The plurality of scraping tines 22 and the plurality of scraping tines 23 are alternately and continuously arrayed in a direction in which the noodle scraper 21 extends.

The long scraping tines 22 are disposed in the shallow grooves 20 of the cutting blade rolls 18 so as to be engaged with the shallow grooves 20.

The short scraping tines 23 are disposed in the deep grooves 19 of the cutting blade rolls 18 so as to be engaged with the deep grooves 19.

Toroidal-Groove Sections Having Two Depths

Firstly, the toroidal-groove sections having two depths, and a noodle scraper engaged with the toroidal-groove sections will be described.

In addition, in the short scraping tines 23 as shown in FIGS. 9 to 17 of the embodiment, a folded shape or a curved shape is formed at a tine-base section 24 or at a tine-middle section 25.

Therefore, the scraping tines 23 are folded or curved so as to face bottom portions of the groove section of the cutting blade rolls that are engaged with the scraping tine 23.

Figure 19:
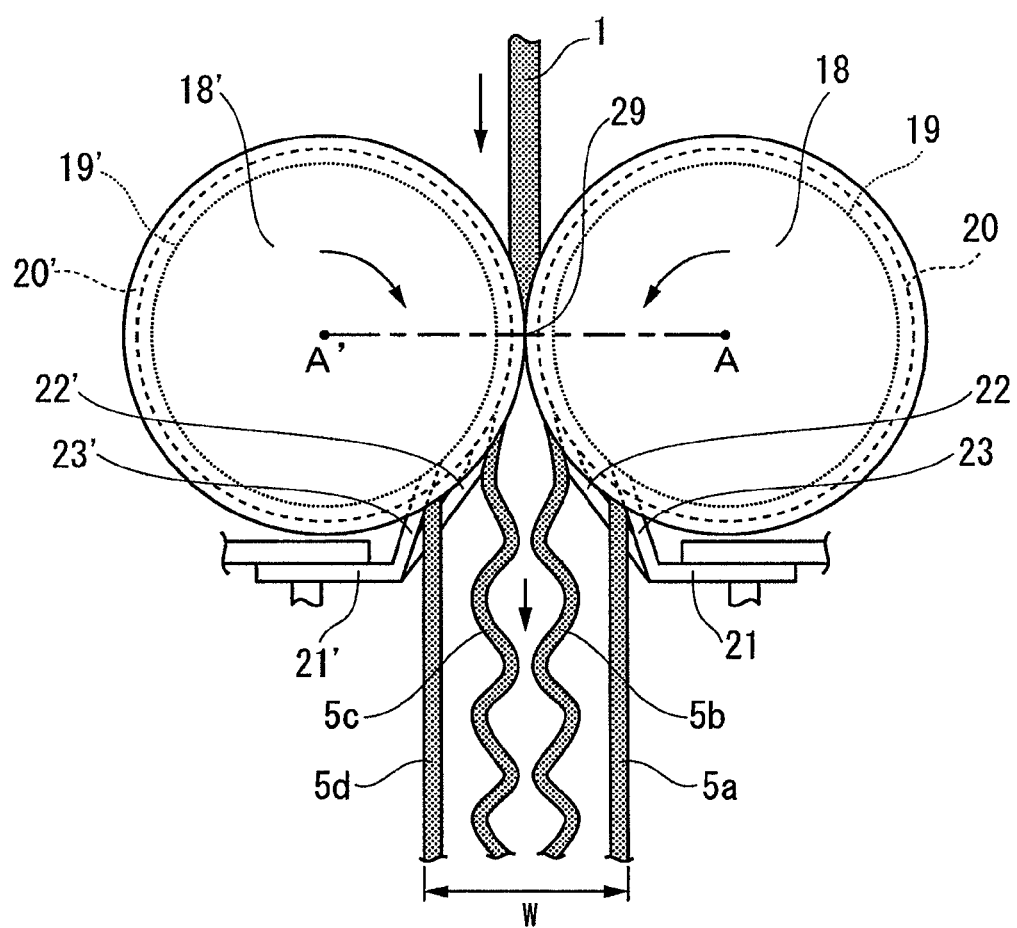
FIG. 19 is a side view schematically illustrating a state where the noodles are continuously cut and ejected in the apparatus for cutting and ejecting noodles related to the present invention.
Figure 22:
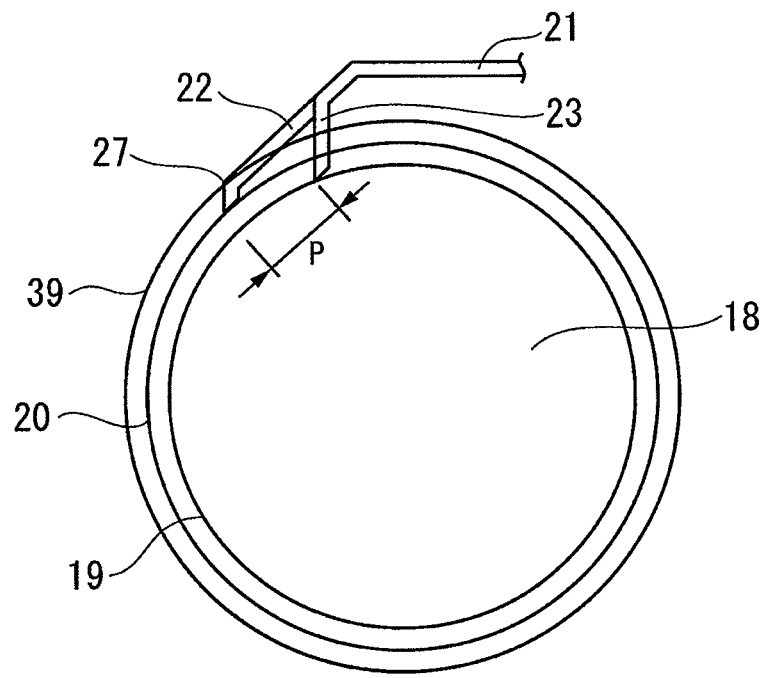
FIG. 22 is a horizontal cross-sectional view schematically showing a state where the position of the folded portion of the scraping tine engaged with a shallow groove of the cutting blade roll coincide with the position of an outer-peripheral face of the cutting blade rolls in the noodle scraper of the apparatus for cutting and ejecting noodles related to the present invention.
Figure 23:
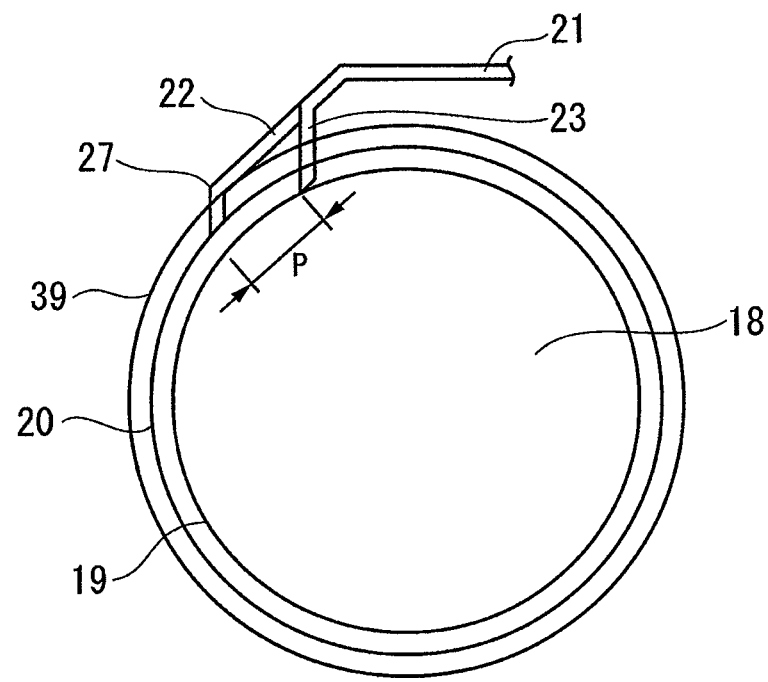
FIG. 23 is a horizontal cross-sectional view schematically showing a state where the folded portion of the scraping tine engaged with the shallow groove of the cutting blade roll is disposed at an outer position of outer-peripheral face of the cutting blade rolls in the noodle scraper of the apparatus for cutting and ejecting noodles related to the present invention.

Since the short scraping tines 23 has the foregoing shape, as shown in FIGS. 19, 22 and 23, the scraping tines 23 can fit into the deep grooves 19 at a steep angle with respect to the tangential line of the deep grooves 19 having a curved surface.

In this way, it is possible to lead the positions at which the noodles 5a and 5d that were cut by and ejected from the cutting blade rolls are peeled and removed, to approach bottom-end portions of each cutting blade roll.

On the other hand, in the case where the lengths of each of the plurality of scraping tines that engage with (fitted into) the groove section of the cutting blade rolls are all the same, it is impossible to sufficiently-obtain the effect that the noodle groups that was cut by and ejected from the cutting blade rolls are distantly-separated from each other as much as possible.

Figure 8:
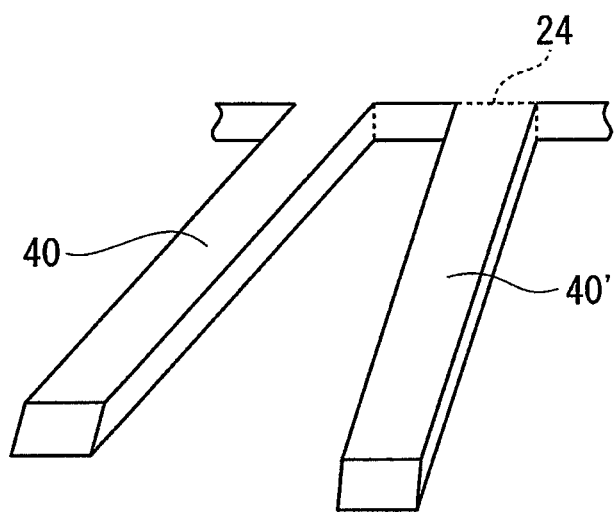
FIG. 8 is a perspective view showing scraping tines of a conventional noodle scraper.
Figure 24:
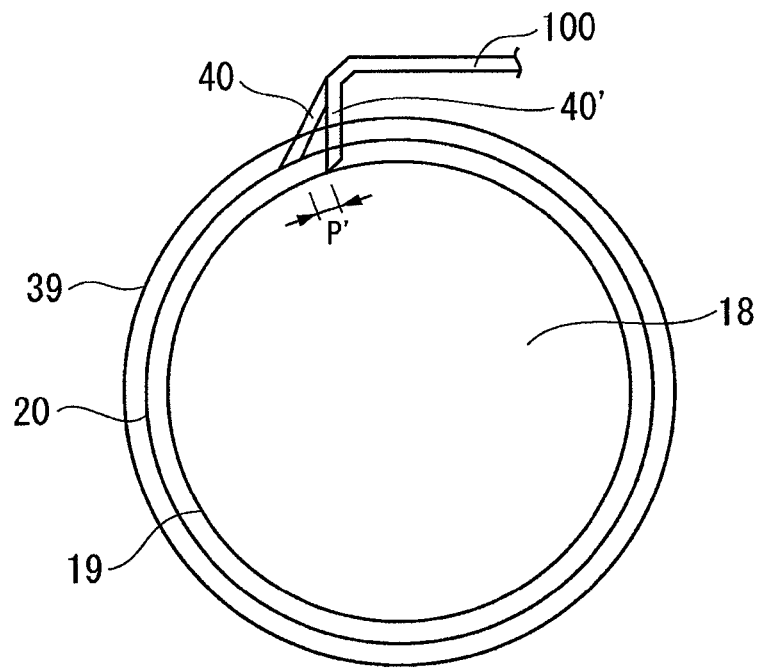
FIG. 24 is a horizontal cross-sectional view schematically showing a state where conventional scraping tines of the noodle scraper are engaged with the cutting blade roll shown in FIG. 22.

Specifically, a noodle scraper (FIG. 8) which has the plurality of scraping tines all having the same length and which has a folded scraping tine and a non-folded scraping tine is prepared, and this noodle scraper is disposed toward the bottom portion of deep grooves of the cutting blade rolls shown in FIG. 24.

In this case, even if the noodle scraper has a folded scraping tine, the width P' at which a front position is separated from a rear position in the circumferential direction of the cutting blade roll is extremely limited by a small width.

Consequently, it is impossible to sufficiently-obtain the effect that the noodle groups that were cut and ejected from the front position and the rear position from the cutting blade rolls are sufficiently-separated from each other with a sufficient distance.

In contrast, as shown in FIGS. 22 and 23, since the tine-length of the scraping tine 23 engaged with the deep groove 19 is short, it is possible to increase the distance between the front position and the rear position in the circumferential direction of the cutting blade rolls at which the noodles are peeled.

As a result, the separation width W (FIG. 19) between the noodles 5a and 5d that were cut by and ejected from the deep grooves 19 and 19' of each of the cutting blade rolls 18 and 18' increases more than the separation width W'(FIG. 18) that is obtained by a conventional method shown in FIG. 18.

Because of this, when the noodles are dropped from the cutting blade rolls 18 and 18', it is possible to reduce adherence of adjacent noodles.

As a result, the effect is obtained that it is possible to reduce and prevent the noodles from being adhered to and agglutinated to each other caused by steaming and boiling.

In addition, In FIG. 5, the long scraping tine 22 of the noodle scraper related to the present invention has a tine-edge section 26 formed at a front-end thereof.

In addition, the scraping tine 22 has a folded shape or a curved shape that is positioned at an adequate position of the tine-edge section 26 and that faces toward a bottom portion of the shallow groove of the cutting blade rolls 20 of FIG. 4.

Figure 9:
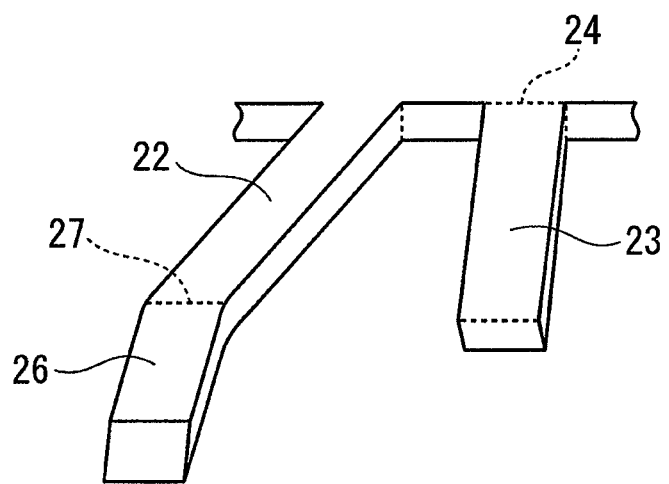
FIG. 9 is a view showing scraping tines of a noodle scraper related to the present invention, and is a perspective view showing a configuration of the scraping tine that is folded.
Figure 10:
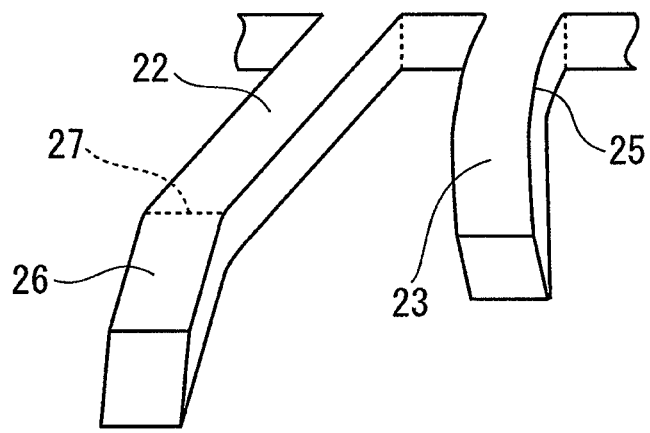
FIG. 10 is a view showing a modified example of scraping tines of the noodle scraper related to the present invention, and is a perspective view showing a folded shape or a curved shape of the scraping tine.
Figure 11:
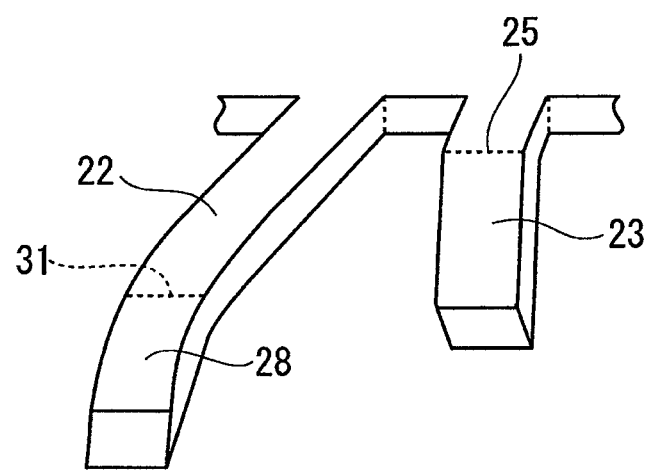
FIG. 11 is a view showing a modified example of scraping tines of the noodle scraper related to the present invention, and is a perspective view showing a folded shape or a curved shape of the scraping tine.

FIGS. 9 to 11 show a structure of the long scraping tine 22 which has a folded portion 27 or a curved portion 28 in combination with the short scraping tine 23.

The long tine in combination with the short tine is not limited to the structure shown in FIG. 4, and they may be appropriately combined.

Figure 16:
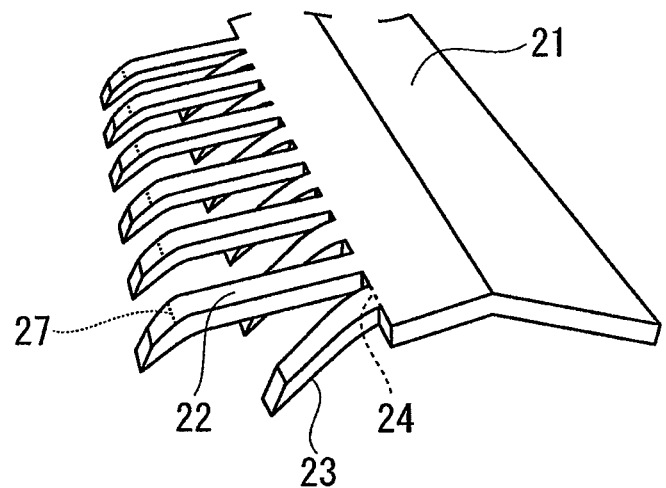
FIG. 16 is a perspective view showing a plurality of scraping tines that are consecutively arrayed at the noodle scraper related to the present invention.

In addition, FIG. 16 is a perspective view schematically showing the noodle scraper in which the scraping tines 22 and 23 are consecutively arrayed.

Since the long scraping tine 22 has the above-described folded portion 27 or curved portion 28, the tine-edge section 26 of the scraping tine 22 is reliably fitted into the shallow groove 20 of the cutting blade rolls 18 and 18' as shown in FIG. 19.

In addition, it is possible to lead the positions at which the tine-edge section 26 of the scraping tine 22 is engaged with the shallow groove 20, to approach a cutting-ejection line 29 of the cutting blade rolls 18 and 18'.

Consequently, in the circumferential direction of the cutting blade rolls 18 and 18', the distance between the front position and the rear position at which the noodles are peeled increases.

Thus, it is possible to increase the relative distance P (FIGS. 22 and 23) between the position at which the noodles 5a and 5d that were cut by and ejected from the deep grooves 19 and 19' are peeled, and the position at which the noodles 5b and 5c that were cut by and ejected from the shallow grooves 20 and 20' are peeled.

As a result, the distance between the noodles further increases in the direction from the front position or the rear position where the noodles are cut by and ejected from the cutting blade rolls 18 and 18'; the plurality of adjacent noodles are suppressed from being adhered to and agglutinated to each other.

In the long scraping tines and the short scraping tines which are employed in the noodle scraper related to the present invention, a folded angle of the scraping tine, a degree of curvature of the scraping tine (for example, a degree of curvature radius or the like), or a folded position or a curved position at in a linear scraping tine may be appropriately adjusted.

For example, the above-described conditions related to the shape scraping tine are appropriately adjusted as necessary, for example, in accordance with conditions in which the plurality of noodles that are cut by and ejected from the cutting blade rolls 18 and 18' are separated from each other, or in accordance with the distance between the plurality of noodles adjacent to each other.

In the noodle scraper 21 related to the present invention, a sloped face 34 that is inclined with respect to a direction orthogonal to a direction in which the tine-edge section 26 extends may be provided at the long scraping tine 22 shown in FIGS. 5 and 9 to 11.

Specifically, the sloped face 34 may be formed at the folded portion 27 or the curved portion 28 which are formed at the tine-edge section 26 of the scraping tine 22, and at the portion including a outer-peripheral side 32 and a front-end portion 33 of a tine-edge section 26 of the folded portion 27 or the curving-start portion 31.

Here, the sloped face 34 is a face that is inclined with respect to a plane of the tine-edge section 26 with a predetermined angle.

The sloped face 34 is composed of, for example, a plane, a curved surface, or a face in which they are combined.

As a method for forming the sloped face 34, for example, a method for cutting the tine-edge section 26 is adopted.

In the case where the sloped face 34 is formed at the tine-edge section 26 in the above-described manner, the noodles that are cut and ejected by the cutting blade rolls 18 and 18' and that are in the shallow grooves 20, are peeled by the scraping tine 22 while being in contact with the sloped face 34, and are removed from the shallow grooves 20.

In the process in which the noodles are peeled and removed in the above-described manner, the removing direction of the cut-ejected noodles is inclined along the sloped face 34 and converted into the lateral direction of the scraping tine 22 (direction orthogonal to the direction in which the tine-edge section 26 extends).

For this reason, a torsional action occurs with respect to the axial direction of the noodles, and displacement of the noodles that are cut by and ejected from the shallow grooves 20 which are caused by a rotation action occurs.

The sloped face 34 (34a, 34b, 34c, and 34d) of the noodle scraper 21 related to the present invention will be described with reference to FIGS. 12 to 15.

Figure 12:
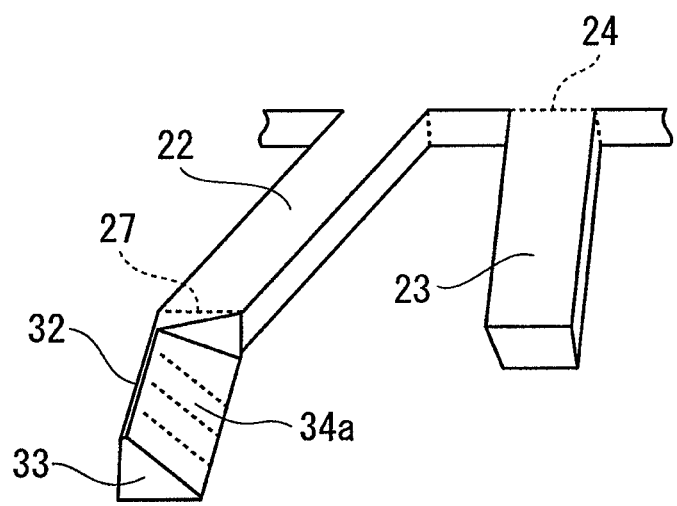
FIG. 12 is a view showing scraping tines of the noodle scraper related to the present invention, and is a perspective view showing a sloped face provided at one side of a tine-edge section of the scraping tine.

FIG. 12 is a perspective view showing the sloped face that is provided at the tine-edge section 26 of the scraping tine 22.

Here, the sloped face 34a has a single plane, is formed at a portion that includes the outer-peripheral side 32 of the folded portion 27 and the front-end portion 33 of the tine-edge section 26, and is formed at one side of the tine-edge section 26.

In addition, the sloped face 34a is obtained by cutting the tine-edge section 26 shown in FIG. 9 in an oblique direction.

Figure 13:
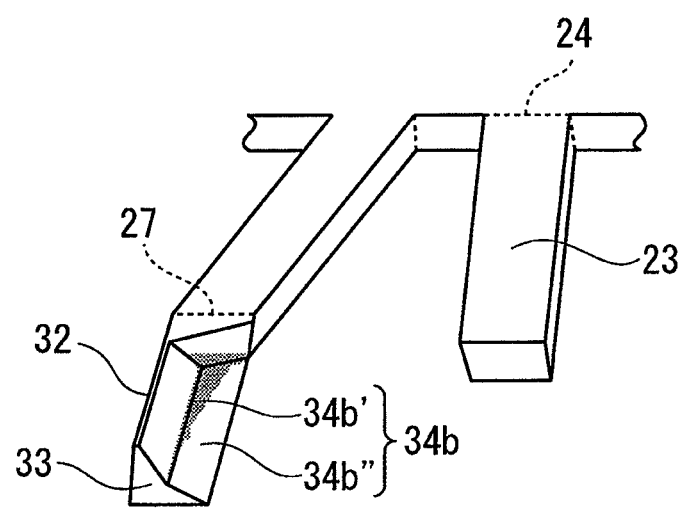
FIG. 13 is a view showing a modified example of scraping tines of the noodle scraper related to the present invention, and is a perspective view showing the sloped face provided at one side of the tine-edge section of the scraping tine.

FIG. 13 is a perspective view showing a first modified example of sloped face that is provided at the tine-edge section 26 of the scraping tine 22.

Here, the sloped face 34b has a combined face, which is constituted of two planes 34b' and 34b", is formed at a portion that includes the outer-peripheral side 32 of the folded portion 27 and the front-end portion 33 of the tine-edge section 26, and is formed at one side of the tine-edge section 26.

In addition, the sloped face 34b is obtained by cutting the tine-edge section 26 shown in FIG. 9 in the oblique direction.

Figure 14:
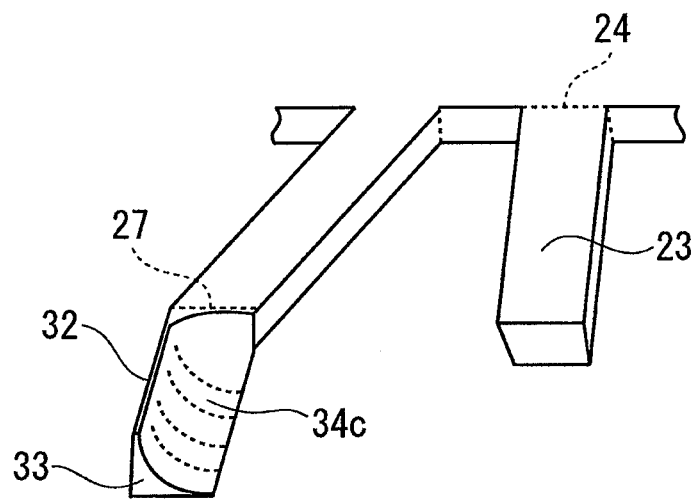
FIG. 14 is a view showing a modified example of scraping tines of the noodle scraper related to the present invention, and is a perspective view showing the sloped face provided at one side of the tine-edge section of the scraping tine.

FIG. 14 is a perspective view showing a second modified example of sloped face that is provided at the tine-edge section 26 of the scraping tine 22.

Here, the sloped face 34c has a curved surface at which a concave groove is formed, is formed at a portion that includes the outer-peripheral side 32 of the folded portion 27 and the front-end portion 33 of the tine-edge section 26, and is formed at one side of the tine-edge section 26.

In addition, the sloped face 34c is obtained by cutting the tine-edge section 26 shown in FIG. 9 so as to form a concave shape.

In addition, the sloped face 34c has a circular cylinder face.

Figure 15:
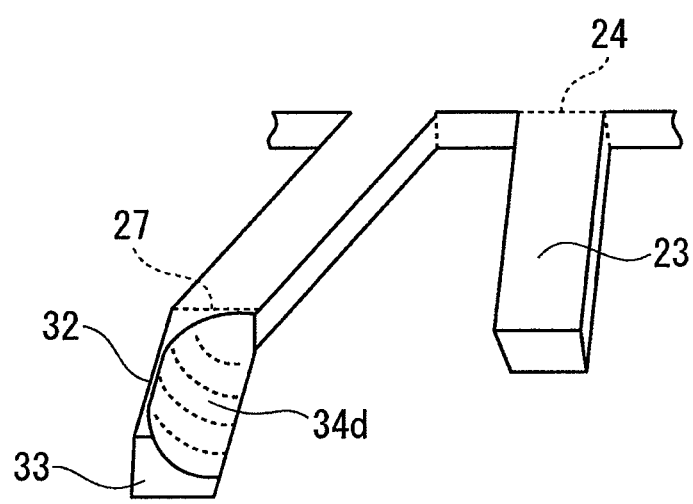
FIG. 15 is a view showing a modified example of scraping tines of the noodle scraper related to the present invention, and is a perspective view showing the sloped face provided at one side of the tine-edge section of the scraping tine.

FIG. 15 is a perspective view showing a third modified example of sloped face that is provided at the tine-edge section 26 of the scraping tine 22.

Here, the sloped face 34d has a curved surface in which a groove having a spherical surface is formed, is formed at a portion that includes the outer-peripheral side 32 of the folded portion 27 and the front-end portion 33 of the tine-edge section 26, and is formed at one side of the tine-edge section 26.

In addition, the sloped face 34c is obtained by cutting the tine-edge section 26 shown in FIG. 9 so as to form a concave shape.

The foregoing sloped faces is formed at one side of the folded portion 27 or the curved portion 28, and is formed by cutting so as to obtain the configuration that is inclined from an upper face of the tine-edge section 26 toward a bottom of the tine-edge section 26 (including somewhat concave and convex configuration).

The cutting method for obtaining sloped face is not restricted.

Figure 17:
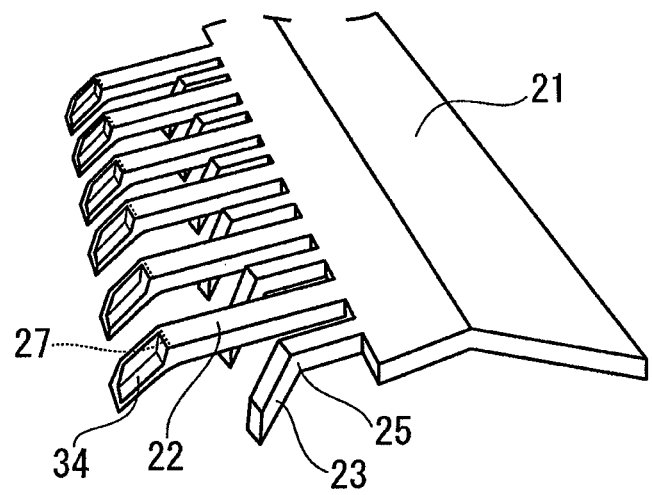
FIG. 17 is a perspective view showing a modified example of plurality of scraping tines that are consecutively arrayed at the noodle scraper related to the present invention.

FIG. 17 is a perspective view schematically showing the noodle scraper 21 in which the long scraping tines 22 and having the above-described sloped faces 34, and the short scraping tines 23 and having the folded portion formed at the tine-middle section 25, are alternately and consecutively arrayed.

Subsequently, a state where the noodles are peeled by the scraping tine 22 formed with the sloped face 34 in a noodle production step will be specifically described.

Figure 6:
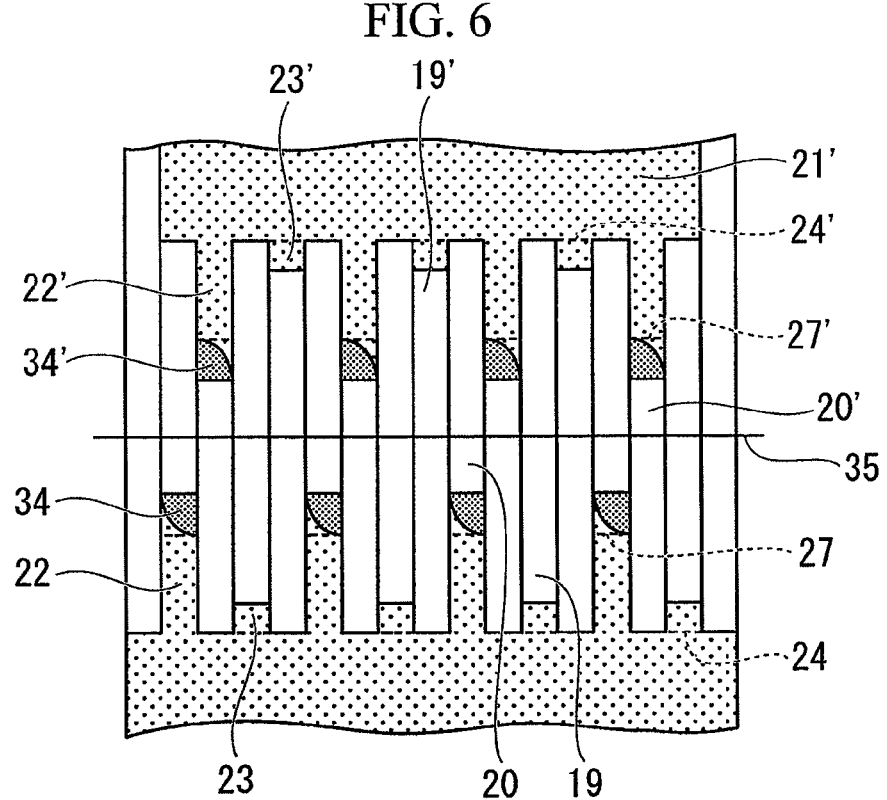
FIG. 6 is a schematic bottom view showing an apparatus for cutting and ejecting noodles related to the present invention from a bottom face side.

FIG. 6 is a bottom view from a bottom face side showing the apparatus for cutting and ejecting noodles related to the present invention.

In FIG. 6, the noodle scraper 21 in which the long scraping tines and the short scraping tines are alternately arranged as shown in FIG. 5 is used.

In addition, the long scraping tine 22 in which the sloped face 34 is formed at the folded portion 27 is used as the long scraping tine.

In FIG. 6, the scraping tines of the foregoing noodle scraper 21 are engaged with the groove sections of the square cutting blade rolls 18 and 18' shown in FIG. 4.

Specifically, the square cutting blade rolls 18 and 18' are constituted of the deep grooves 19 and 19' and the shallow grooves 20 and 20', and have the toroidal-groove sections having two depths. The short scraping tines 23 are engaged with the deep grooves 19 and 19', and the long scraping tines 22 are engaged with the shallow grooves 20 and 20'.

Figure 7:
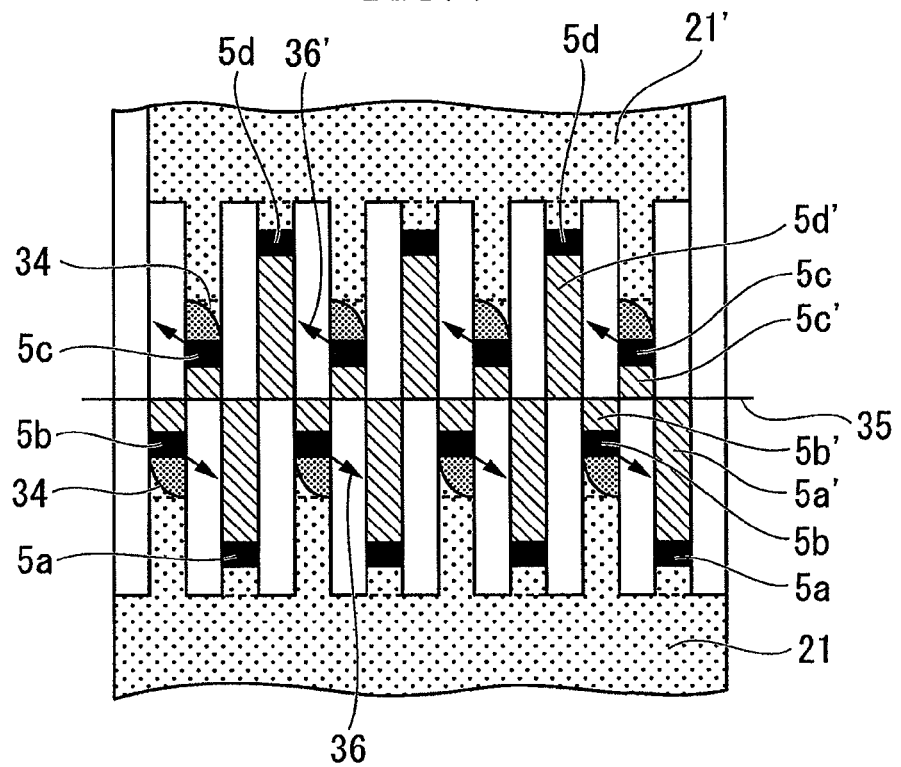
FIG. 7 is a view illustrating a state where noodles are cut and ejected form the apparatus for cutting and ejecting noodles shown in FIG. 6, and is a schematic bottom view showing the apparatus for cutting and ejecting noodles from a bottom face side.

FIG. 7 illustrates a state where the noodles are cut and ejected in the apparatus for cutting and ejecting noodles shown in FIG. 6, and is a bottom view from a bottom face side showing the apparatus for cutting and ejecting noodles.

In FIG. 7, a state where the plurality of noodles that are cut by and ejected from the cutting blade rolls 18 and 18' are separated from each other and moved is schematically shown.

In addition, FIG. 19 is a side view schematically showing a state where the noodles are continuously cut and ejected by the cutting blade rolls 18 and 18' and the noodle scrapers 21 and 21'.

As shown in FIG. 7, the noodles that were cut and ejected at the cutting-ejection line 35 of the cutting blade rolls 18 and 18' are pressed into the toroidal-groove sections that are engaged with each other, adhered to inner walls of the toroidal-groove sections, and moved to the bottom of the cutting blade rolls 18 and 18' along with rotation of the cutting blade rolls 18 and 18'.

Reference numerals 5a', 5b', 5c', and 5d' represent the noodles that are moved to the bottom of the cutting blade rolls 18 and 18'.

Next, when the noodles 5a', 5b', 5c', and 5d' reach engagement portions at which the noodle scrapers 21 and 21' are engaged with the deep grooves 19 and 19' and engagement portions at which the noodle scrapers 21 and 21' are engaged with the shallow grooves 20 and 20', the noodles are peeled from the shallow grooves 20 and 20' and the deep grooves 19 and 19' by the noodle scrapers 21 and 21'.

Reference numerals 5a, 5b and 5c, and 5d represent the noodles that are peeled from the shallow grooves 20 and 20' and the deep grooves 19 and 19'.

Consequently, the plurality of noodles 5a, 5b and 5c, and 5d are removed from the cutting blade rolls 18 and 18'.

Here, the noodle scrapers 21 and 21' have the scraping tines that have two tine-lengths that are long-length and short-length and have a folding, that is, have the long scraping tines 22 and the short scraping tines 23.

Because of this, at two rows (front row and rear row) that are the front position and the rear position in the circumferential direction of the cutting blade rolls 18 and 18', the noodles that were cut by and ejected from each of cutting blade rolls 18 and 18' are peeled so as to be separated from each other with a large distance.

Namely, the noodles are peeled such that the distance between the front position and the rear position increases.

The foregoing noodle groups of the two rows form a row extending in the axial direction of the cutting blade rolls.

In each row, the distance between adjacent noodles is a space corresponding to one noodle size, and is wide so that the gap corresponds to the width of three groove sections (19, 19', 20, and 20').

Consequently, the plurality of noodles that are adjacent to each other, front to back and side to side, are dropped from the cutting blade rolls 18 and 18' while being separated from each other, and the plurality of noodles are extremely suppressed from being in contact with and adhered to each other.

In addition, the above-described sloped faces 34 are formed at the long scraping tines 22 that are engaged with the shallow grooves 20 and 20'.

For this reason, the noodles 5b' and 5c' that were cut by and ejected from the shallow grooves 20 and 20' are peeled along the sloped face 34 shown in FIG. 7 toward the lateral direction of the sloped face 34.

Therefore, the noodles 5b' and 5c' are peeled in the arrow direction indicated by reference numerals 36 and 36', the scraping direction of the noodles is converted thereinto from the rotation direction of the cutting blade rolls 18 and 18'.

Because of this, a torsional action occurs with respect to the axial direction of the noodles along the sloped face 34, and displacement of the noodles that are cut by and ejected from the shallow grooves 20 which are caused by a rotation action occurs.

The noodles are removed from the cutting blade rolls 18 and 18' while being displaced by the rotation action.

On the other hand, in the noodles 5a and 5d that were cut by and ejected from the deep grooves 19 and 19', the resultant force of the downward force of push out from the cutting blade rolls 18 and 18' caused by the rotation force of the cutting blade rolls 18 and 18' in combination with the gravitational force caused by the weight of the noodles (own weight) occurs, and the noodles 5a and 5d are linearly-dropped.

In the noodles 5b and 5c that were cut by and ejected from the shallow grooves 20 and 20' and that are different from the foregoing noodles 5a and 5d, the torsional force or the displacement force caused by rotation action further occurs in addition to the resultant force of the rotation force of the cutting blade rolls in combination with the gravitational force caused by the weight of the noodles.

The foregoing torsional force or displacement force caused by the rotation action is the force into which a part of the rotation force of the cutting blade rolls is inverted due to the reactive action in which the noodles collide with the sloped face 34.

Specifically, the noodles are pushed out in the oblique direction with respect to the rotation direction of the cutting blade rolls by the sloped face 34 provided at one side of the tine-edge section 26; because of this, the conversion action in which the direction of peeling the noodles is converted occurs.

Figure 20:
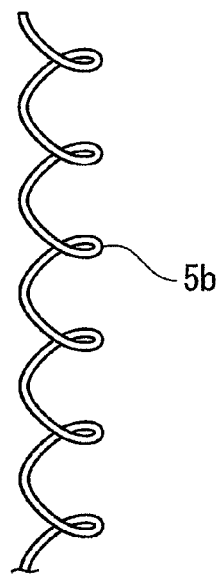
FIG. 20 is a schematic view illustrating a state where the noodles that were cut and ejected by the sloped face provided at one side of the tine-edge section of the scraping tine fall.

As a result, as shown in FIG. 20 and reference numerals 5b and 5c shown in FIG. 19, it is possible to lead the noodles peeled by sloped face 34 to fall from the cutting blade rolls 18 and 18' in a spiral manner.

Here, the "spiral manner" represents, for example, the shape of a coil spring (coiled spring) as shown in FIG. 20, or the line shape of the coil spring that is projected onto a plane in an obliquely direction (the linear shape of the coil spring is projected onto a plane by obliquely seeing).

As described above, adjacent noodles 5b and 5c that were cut by and ejected from the shallow grooves 20 and 20' or the noodles 5b and 5c that were cut by and ejected from the shallow grooves 20 and 20', and adjacent noodles 5a and 5d that were cut and ejected from the deep grooves 19 and 19' are obtained.

Here, the points at which the noodles 5b and 5c are in contact with the noodles 5a and 5d are only intersection points at which the noodles intersect with each other.

Consequently, the noodles are prevented from being in contact with each other while being linearly extended.

Even if the noodles 5b and 5c are contact with the noodles 5a and 5d, it is possible to minimize the amount of contact area per unit length of the noodle to be d.

Consequently, in the shorn faces of the noodles that are adjacent to each other, the noodles are prevented from being joined to or adhered to each other.

Therefore, it is possible to considerably solve the problem in that the plurality of noodles are adhered to or agglutinated to each other by steaming and boiling.

FIG. 21 is a perspective view schematically showing state where the plurality of noodles that were cut and ejected by the apparatus for cutting and ejecting noodles related to the present invention are deposited, a configuration of the plurality of noodles stacked in layers, and a state where the plurality of noodles are transported.

In addition, FIG. 21 corresponds to FIG. 1.

In FIG. 21, a state where the noodle scraper 6 is disposed at the cutting blade rolls 4, the noodle groups are cut by and ejected from the cutting blade rolls 4, and the noodle groups are transported to the noodle feeding conveyor 8 by passing through the guide shoot (guide section) 7 is shown.

In addition, FIG. 21 shows a step in which the noodle groups are cut and ejected from the cutting blade rolls 4, a step in which the noodle groups are guided by the guide shoot 7, and a step in which the noodle groups are stacked in layers on the noodle feeding conveyor 8.

In addition, FIG. 21 is a view illustrating the noodles 5a and 5b are stacked in layers in the noodles 5a, 5b and 5c, and 5d.

In FIG. 21, for convenience of explanation, the cutting blade rolls indicated by reference numeral 4' in the pair of cutting blade rolls 4 and 4' in FIG. 1, and the noodle scrapers 6 and 6' are omitted.

In addition, in FIG. 21, the number of noodles that are ejected from the cutting blade rolls 4 and 4' is limited.

The noodles 5a, 5b and 5c, and 5d that are ejected from the cutting blade rolls 4 and 4' are dropped as shown in FIG. 19.

In addition, as shown in FIG. 7, the noodles 5a, 5b and 5c, and 5d are separated and fall from a bottom face of the noodle scraper.

That is, as described above, the noodles 5b and 5c fall in a spiral manner, and the noodles 5a and 5d linearly fall.

The noodles 5a, 5b and 5c, and 5d that were cut by and ejected from the cutting blade rolls 4 and 4' in the above-described manner reach the guide shoot 7 disposed under the noodle scraper (not shown).

In the guide shoot 7, the side plates 12 are provided at both sides thereof corresponding to the width of the cutting blade rolls; however, a structure in which the side plates 12 are not provided, that is, the guide plate 9 is only provided may be employed.

The guide plate 9 is disposed so as to be inclined relative to the direction in which a belt of the noodle feeding conveyor 8 travels, that is, so as to have a slope way from the cutting blade rolls 4 toward the noodle feeding conveyor 8.

Consequently, the noodles reach the guide plate 9 in order of, the noodles 5a that were cut by and ejected from the deep grooves, the noodles 5b that were cut by and ejected from the shallow grooves, the noodles that were cut by and ejected from the shallow groove (the noodles indicated by reference numeral 5c in FIG. 19 and omitted in FIG. 21), and the noodles that were cut by and ejected from the deep grooves (noodles indicated by reference numeral 5d in FIG. 19 and omitted in FIG. 21). The above-described noodle groups slide down toward a bottom of the guide plate 9 while being sequentially deposited.

The foregoing four noodles are stacked in layers, and transferred to the noodle feeding conveyor 8 disposed under the guide plate 9.

At this time, the noodle group 5a that was cut by and ejected from the deep grooves is dropped and reaches the guide plate 9, thereafter, friction occurs between the guide plate 9 and the noodle groups, which is caused by the material of the guide plate 9 or the degree of inclination.

Because of this, as represented by reference numeral 37, the noodle group 5a slides downward on the inclined guide plate 9 in a wavy manner.

In contrast, the noodle group 5b that was cut by and ejected from the shallow groove falls in a spiral manner as shown in FIG. 20 and is deposited in a spiral manner on the guide plate 9 and on the noodle group 5a that reached the guide plate 9 in advance.

For this reason, the noodle groups 5a and 5b are stacked in layers.

In addition, the noodle groups 5a and 5b stacked in layers slide downward on the guide plate 9.

After that, in the continuously cutting and ejecting, the noodle group 5b that was cut by and ejected from the shallow groove in a way similar to the above-described manner reaches and is deposited on the guide plate 9 and on the noodle group 5a that preliminarily reached the guide plate 9, and the noodle group 5b slides down the guide plate 9.

In addition, the noodle groups that are on the guide plate 9 are transferred to the noodle feeding conveyor 8 and transported.

For this reason, the noodle group 5b that was cut and ejected in a spiral manner is prevented from being unlimitedly stacked in layers in a circular manner such that a circle is formed around a point.

In addition, the noodle group 5b that was cut by and ejected from the cutting blade rolls falls so as to repeatedly draw a circular arc and is deposited on the noodle group 5a while having a layered configuration (reference numeral 38) in a spiral manner, along with the action where the noodle groups 5a and 5b slide down the guide plate 9 and the action where the noodles 5a are 5b transferred by the noodle feeding conveyor 8.

The noodle groups 5a and 5b that are stacked in layers in the above-described manner are transported by the noodle feeding conveyor 8.

Furthermore, the above-described action will be specifically described.

The noodle group 5a that reached the noodle feeding conveyor 8 is bent in a wavy manner depending on the feeding speed of the noodle feeding conveyor 8.

Here, in the noodle group 5a that reached the noodle feeding conveyor 8, a distance between the foregoing bent shapes is compressed, and a two-dimensional waveform is obtained.

On the other hand, the noodle group 5b is deposited on the noodle group 5a while having a line shape like that of a coil spring projected onto a plane seen from an oblique direction.

In addition, the noodle group 5b is compressed in the feeding direction depending on the feeding speed of the noodle feeding conveyor 8 when being transferred from the guide plate 9 to the noodle feeding conveyor 8.

Consequently, the noodle group 5b has a plurality of ring-shaped portions.

In a contact point forming a part of the ring-shaped portions, a top face of the noodle is in contact with a back face of the noodle.

In addition, in other words, the noodle group 5b reaches the guide plate 9 such that the noodles formed in a spiral manner are stacked in layers, while traveling so that center positions of the ring-shaped noodles are slid on the guide plate 9, and the noodle group 5b slides on the guide plate 9 and is transferred to the noodle feeding conveyor 8.

As described above, the noodle group 5a that was cut by and ejected from the deep grooves is noodles that are formed in a wavy manner on a plane as indicated by reference numeral 37 so as to include the waveform having a predetermined amplitude of vibration and a predetermined phase.

In contrast, as indicated by reference numeral 38, the noodle group 5*b* that was cut by and ejected from the shallow groove includes a plurality of ring-shaped noodle portions formed by intersecting the noodles itself.

Specifically, the noodle group 5*b* reaches and downwardly slides on the guide plate 9 in a spiral manner as shown in FIG. 20, the noodle group 5*b* is thereby formed so as to have a plurality of ring-shaped noodle portions on the noodle feeding conveyer 8.

In other words, the noodle group 5*b* is constituted of the plurality of ring-shaped noodle portions that are continuously formed by one noodle, and curved relay noodle portions that connects adjacent ring-shaped noodle portions with each other.

In addition, a feeding speed of the noodle feeding conveyer 8 and a rotation speed of the cutting blade rolls 4 and 4' are adequately adjusted so that the ring-shaped noodle portions are successively formed.

As described above, the noodle groups 5*a* and 5*b* are formed, even if both groups are stacked in layers, since the deposition conditions of the noodle groups 5*a* and 5*b* are completely different from each other, the contact point at which adjacent noodles that are in contact with each other or the adhesion point at which they are adhered to each other are limited only to intersection points of the noodles.

Furthermore, the intersection points of the noodles are randomly distributed.

Consequently, it is possible to extremely reduce the number of the intersection points of the noodles, the intersection points are formed at micro portions in a limited way.

Furthermore, the noodles 5*b* that were cut by and ejected from the shallow grooves are removed from the cutting blade rolls between the noodles 5*a* and 5*a* that were cut by and ejected from the deep grooves.

For this reason, the region in which the noodles 5*a* and the noodles 5*b* are stacked in layers strides the noodles that were cut by and ejected from the deep grooves disposed at the right and left.

Because of this, the contact points and the adhesion point of the noodles are further randomly distributed.

As a result, the present invention is different from a method for stacking noodle groups due to a conventional method in which the noodle group that was cut by and ejected from the cutting blade rolls lands while being in the wavy manners similar to each other and in which the noodles are stacked in layers in a state where the landing positions thereof are attuned to each other.

In contrast to the foregoing conventional method, in the noodle groups that are formed by the present invention, the number of portions at which the noodles are adhered to each other is dramatically low.

As a result, in a steaming-boiling step, it is possible to drastically decrease adhesion and agglutination of the noodles that are adjacent to each other.

Therefore, it is possible to solve conventional problems which are caused by adhesion and agglutination of the noodles.

In addition, in the stacked condition of the noodle groups by conventional methods, adjacent noodles are adhered to each other by line contacting, face contacting, or line contacting and face contacting.

In contrast, in the present invention, the noodles disposed while being in a wavy manner (noodles formed so as to include the waveform having a predetermined amplitude of vibration and a predetermined phase), and the noodles formed in a spiral manner (noodles having the plurality of ring-shaped noodle portions and relay noodle portions) are stacked in layers.

In this case, the portions at which both noodles are in contact with each other when being stacked in layers are intersection points, that is, points.

Consequently, since the noodles are adhered at the points and the adhesion portions thereof are limited to micro points, even if the plurality of noodles are in a state of being adhered and agglutinated to each other in a steaming-boiling step, adhesion portions are promptly dissociated and the noodles easily ravel when products are being cooked and restored.

Consequently, it is possible to solve the problems of cooking defects and quality defects.

In the apparatus for cutting and ejecting noodles of the present invention, the cut-ejected noodles that are peeled by the noodle scraper reach the guide plate or the guide shoot as described above, and are stacked in layers.

Consequently, in order to prevent the reached condition and the stacked condition from being interfered with, it is necessary for a front portion of the guide plate or the guide shoot with respect to the traveling direction of the noodles that are transported by the noodle feeding conveyer (an upside portion between the guide plate and the guide plate, and the noodle feeding conveyer) to be opened.

Therefore, if it is possible to prevent a state where the noodles reach the guide plate and a state where the noodles are stacked in layers from being interfered with, a tube-shaped guide pipe that is used for preventing the noodles from being accidentally deviated may be employed as a guide plate.

In this case, it is necessary to dispose the guide pipe so that the peeled and removed noodles are not physically and forcedly bent.

Specifically, it is necessary to dispose the guide pipe so as to have a sufficient gap between the guide plate that becomes a base, and inner surfaces that are opposed to each other in the pipe surrounding the guide plate.

A guide pipe used in a conventional apparatus for cutting and ejecting noodles is employed to lead the noodles that were cut by and ejected from the cutting blade rolls to be forcedly bent.

In contrast, the guide pipe used in the present invention are completely different from a conventional guide pipe in terms of the above-described points, that is, purpose, actions, and effects.

In the apparatus for cutting and ejecting noodles of the present invention, the tine-edge section of the long scraping tine is fitted into the shallow grooves formed at the cutting blade rolls, and the long scraping tine is engaged with the shallow grooves.

In addition, a structure in which the position of the folded portion or the position of the curving-start portion in the long tine-edge section are substantially at the same height position of the outer-peripheral face of the cutting blade rolls may be employed.

Also, the structure in which the position of the folded portion or the position of the curving-start portion in the long tine-edge section are slightly higher than the position of the outer-peripheral face of the cutting blade rolls, that is, are disposed at outer position of an outer-peripheral face of the cutting blade rolls may be employed.

FIGS. 22 and 23 are horizontal cross-sectional views showing a state where the noodle scraper 21 including the scraping tine having two tine-lengths that are long-length and short-length which are constituted of the long scraping tine 22 and the short scraping tine 23 is engaged with the cutting blade roll 18 having two grooves that are deep and shallow which are constituted of the deep groove 19 and the shallow groove 20.

In addition, FIG. 22 schematically shows a state where the position of the folded portion 27 of the scraping tine 22 engaged with the shallow groove 20 of the cutting blade roll 18 coincide with the position of the outer-peripheral face 39 of the cutting blade roll 18.

In other words, a state where the height from the bottom portion of the shallow groove 20 to the position of the folded portion 27 is substantially the same as the height from the bottom portion of the shallow groove 20 to the position of the outer-peripheral face 39 is shown.

In addition, FIG. 23 schematically shows a state where the folded portion 27 of the scraping tine 22 engaged with the shallow grooves 20 of the cutting blade rolls 18 is disposed outward the position of the outer-peripheral face 39 of the cutting blade rolls 18.

In other words, a state where the height from the bottom portion of the shallow groove 20 to the position of the folded portion 27 is greater than the height from the bottom portion of the shallow groove 20 to the position of the outer-peripheral face 39 is shown.

In contrast, FIG. 24 illustrates a comparative example and is a horizontal cross-sectional view schematically showing a state where a conventional scraping tine of a noodle scraper is engaged with the cutting blade roll of FIGS. 22 and 23.

Specifically, FIG. 24 is a side view schematically showing a state where the noodle scraper 100 including the plurality of scraping tines 40 having the same tine-lengths is engaged with the cutting blade roll.

As evidenced by comparing FIG. 22 with FIG. 24, it is seen that the distance P between the scraping tine 22 and the scraping tine 23 shown in FIG. 22 is wider than the distance P' between scraping tines shown in FIG. 24.

In addition, similarly, it is seen that the distance P between the scraping tine 22 and the scraping tine 23 shown in FIG. 23 is greater than the distance P' between scraping tines shown in FIG. 24.

As remarked above, the distance P is greater than the distance P'; this is because the distance between the front position and the rear position in the circumferential direction of the cutting blade roll 18 is increased, since the long scraping tine 22 has the folded portion 27.

Since the distance P is expanded in the above-described manner, the distance between the position at which the noodle is peeled by the scraping tine 22 and the position at which the noodle is peeled by the scraping tine 23 increases, the noodle groups are spaced from each other and can be reliably separated from each other.

Furthermore, due to coinciding the position of the folded portion 27 with the position of the outer-peripheral face 39 of the cutting blade rolls 18, or due to causing the folded portion 27 to be arranged outward from the position of the outer-peripheral face 39 of the cutting blade roll 18, it is possible to reliably remove and eject the noodles so as to be outside of the cutting blade rolls 18.

Specifically, in the case where the scraping tine in which the above-described sloped face 34 is formed at the folded portion 27 or the curved portion 28 in the tine-edge section 26 is used, it is possible to reliably guide the noodles that were peeled from the cutting blade rolls to outside of the cutting blade rolls.

In addition, the noodles are pushed out in the lateral direction of the sloped face 34, consequently, it is possible to generate the force of ejecting the noodles in the oblique direction relative to the direction in which the scraping tine 22 extends.

In addition, in the case of structure in which the folded portion 27 is protruded outside of the outer-peripheral face of the cutting blade rolls 39, it is possible to increase the force of ejecting the noodles in the oblique direction.

Because of this, it is possible to expand the spiral shape in a further large region, the spiral shape being formed after the noodles peeled by the scraping tine 22 was removed.

That is, it is possible to increase the diameter of the circle viewed in a vertical direction of the spiral shape shown in FIG. 20.

For this reason, when the plurality of noodles are stacked in layers, it is possible to absorb and reduce the degree of curvature in the noodles.

Since the degree of the curvature is absorbed and reduced when the plurality of noodles are stacked in layers, it is possible to easily and effectively restore the noodles that are products to their original state in a linear manner.

Figure 25:
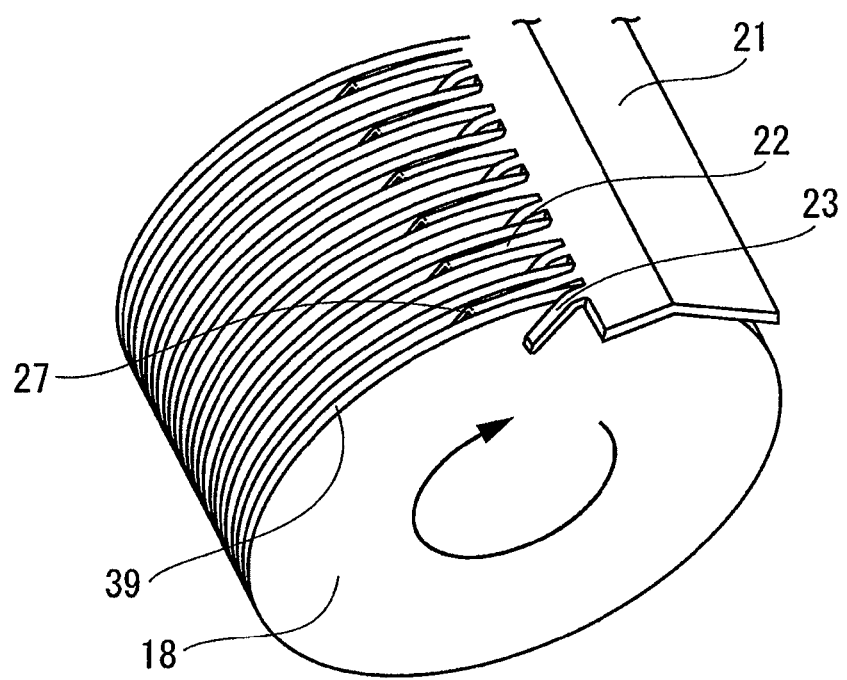
FIG. 25 is a perspective view showing a state where the cutting blade roll shown in FIG. 22 is engaged with the noodle scraper.

FIG. 25 is a perspective view corresponding to FIG. 22 and is a view showing a state where the noodle scraper is engaged with the cutting blade roll.

Figure 26:
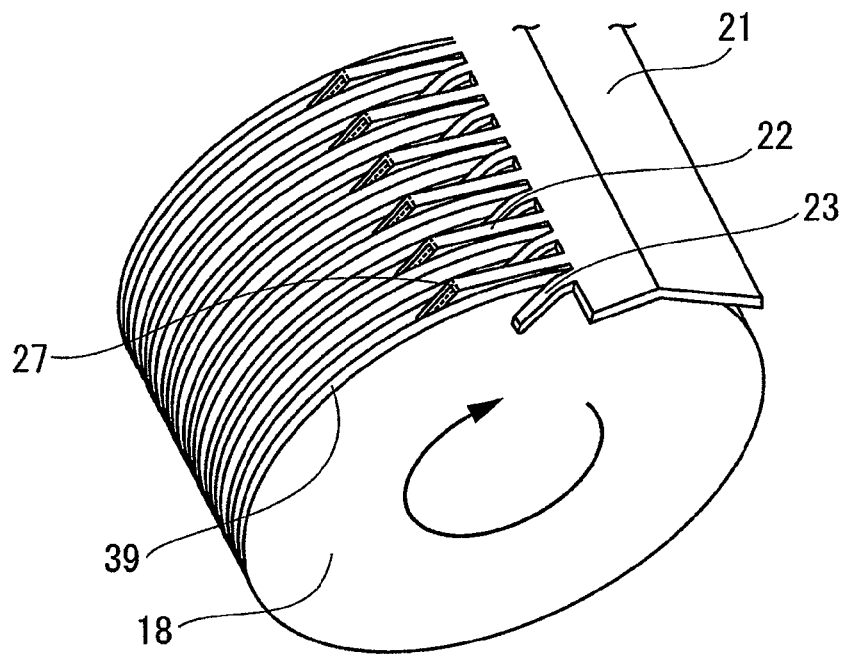
FIG. 26 is a perspective view showing a state where the cutting blade roll shown in FIG. 23 is engaged with the noodle scraper.

FIG. 26 is a perspective view corresponding to FIG. 23, and is a view showing a state where the noodle scraper is engaged with the cutting blade roll.

Figure 27:
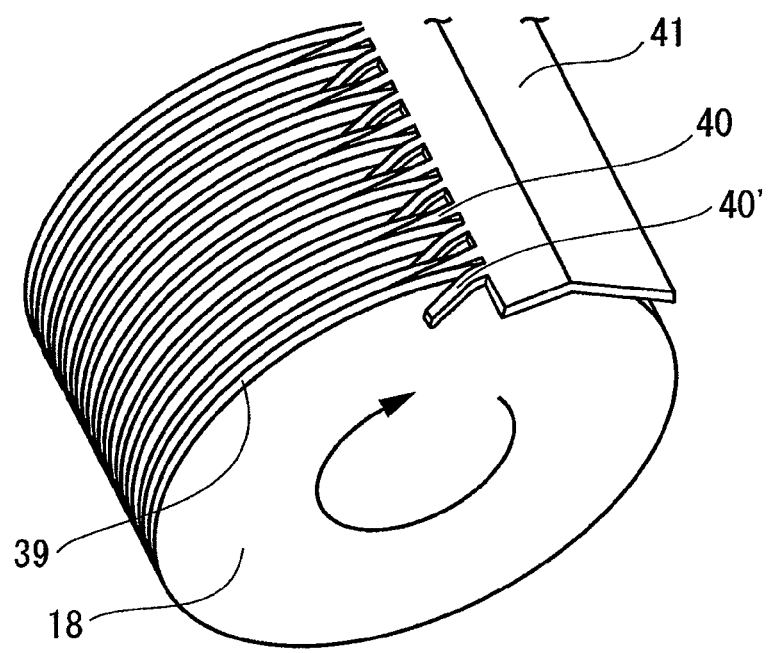
FIG. 27 is a perspective view showing the state where the cutting blade roll shown in FIG. 24 is engaged with the noodle scraper.

FIG. 27 is a perspective view corresponding to FIG. 24, and is a view showing a state where the noodle scraper is engaged with the cutting blade roll.

The pair of cutting blade rolls is employed in a practical noodle production step, therefore, the noodle groups are stacked in layers on the layered structure, in addition to the layered structure of the noodle groups that were cut and ejected as shown in FIG. 21.

Specifically, a spiral noodle layer (reference numeral 38 in FIG. 21) of the noodle group that was cut by and ejected from the shallow groove, and a noodle layer (reference numeral 37 in FIG. 21) that was cut by and ejected from the deep groove and disposed while being in a wavy manner are sequentially stacked in layers on the above-described layered structure on the guide plate or on the guide shoot.

The plurality of noodle groups that were stacked in layers in the above-described manner are transported by the noodle feeding conveyer provided under the guide plate.

In addition, in the above-described layered structure on which the spiral noodle layer and the noodle layer disposed in a wavy manner are stacked in layers, a state where adjacent noodles are in contact with or adhered to each other is the same state as described with reference to FIGS. 20 and 21.

Therefore, it is possible to solve the problems of cooking defects and quality defects in a conventional noodle production step.

In addition, the rotation speed of the cutting blade rolls, the material of the guide plate (shoot), the degree of inclination of the guide plate (shoot), the distance between a point at which the noodles land the sloped face, and a bottom-end portion of the sloped face, a feeding speed of the noodle feeding conveyer, or the like is adequately adjusted and controlled.

Consequently, it is possible to adjust a state where the noodle groups that were cut by and ejected from the deep grooves are disposed while being in a wavy manner, and a state where the noodle groups that were cut by and ejected from the shallow grooves and that are dropped in a spiral manner and disposed are stacked in layers (noodle groups having a plurality of ring-shaped noodle portions).

In addition, the foregoing state can be appropriately set in accordance with a steaming-boiling condition or a product quality.

In both the apparatus for cutting and ejecting noodles and the noodle scraper of the present invention, the cutting blade rolls including two grooves having a plurality of deep grooves and shallow grooves are engaged with the noodle scraper including the scraping tine having two tine-lengths that are long-length and short-length.

As a result, the above-described actions and effects are obtained.

The constitution of both the apparatus for cutting and ejecting noodles and the noodle scraper in which the foregoing actions and the effects are obtained is appropriately modified.

For example, the toroidal-groove sections including the plurality of grooves having the plurality of depths in the cutting blade rolls may be arrayed in an optional arrangement.

In addition, in the noodle scraper engaged with the toroidal-groove sections of the cutting blade rolls, the lengths of the scraping tines may be adjusted in accordance with an arrangement of the above-described toroidal-groove sections.

That is, the long scraping tine or the short scraping tine may be appropriately arranged depending on the toroidal-groove sections including a plurality of grooves having a plurality of depths.

In addition, in the foregoing apparatus for cutting and ejecting noodles and the noodle scraper, the groove section having the shortest depth is engaged with the scraping tine having a longest tine-length, and the groove section having a greatest depth is engaged with the scraping tine having a shortest tine-length.

Second Embodiment

Toroidal-Groove Sections Having Three Depths

Next, toroidal-groove sections having three depths, and a noodle scraper engaged with the toroidal-groove sections will be described.

In the second embodiment, identical symbols are used for the elements which are identical to those of the first embodiment, and the explanations thereof are omitted or simplified.

Figure 28:
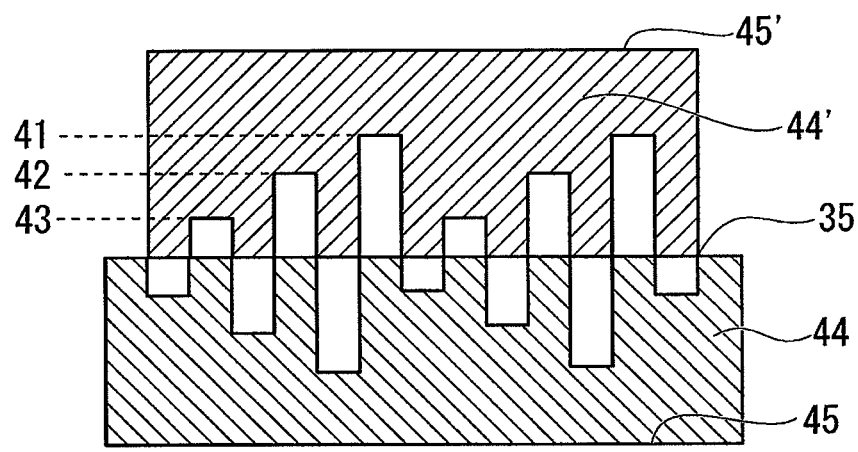
FIG. 28 is a vertical cross-sectional view schematically showing the cutting blade rolls that have three depths and are employed in the apparatus for cutting and ejecting noodles related to the present invention in the axial line.

FIG. 28 is a cross-sectional view schematically showing cutting blade rolls having three depths, and is a vertical cross-sectional view of the cutting blade rolls in axial lines 45 and 45'.

Cutting blade rolls 44 and 44' has a shallow grooves 43 having a shortest depth (first groove section, toroidal-groove sections), a deep grooves 41 having a greatest depth (second groove section, toroidal-groove sections), and a middle grooves 42 having a depth that is greater than that of the shallow grooves 43 and is less than that of the deep grooves 41 (third groove section, toroidal-groove sections).

In the cutting blade rolls 44 and 44', the groove sections 41, 42, and 43 are provided so that the depths thereof increase in order along the axial direction of the cutting blade rolls; and groups, each of which is consisted of the groove sections 41, 42, and 43, are repeatedly multi-provided along axial directions of the cutting blade rolls.

Figure 29:
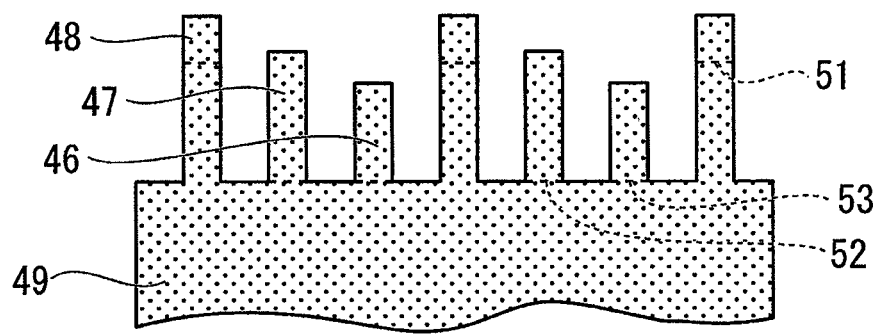
FIG. 29 is a plan view schematically showing the noodle scraper related to the present invention, and is a plan view schematically showing the noodle scraper having scraping tines engaged with the cutting blade rolls shown in FIG. 28.

FIG. 29 is a plan view schematically showing a noodle scraper having the scraping tine engaged with the cutting blade roll 44 shown in FIG. 28.

A noodle scraper 49 has a long scraping tine 48 having a long tine-length (first scraping tine, and long scraping tine), a scraping tine 46 having a tine-length that is shorter than that of the scraping tine 48 (second scraping tine, short scraping tine), and a scraping tine 47 having a tine-length that is shorter than that of the scraping tine 48 and is longer than that of the scraping tine 46 (third scraping tine, middle scraping tine).

Namely, the noodle scraper 49 is constituted of the scraping tines having three tine-lengths that are short, middle, and long.

In addition, the position of the noodle scraper 49 is determined with respect to the cutting blade rolls 44 so that the scraping tine 48 is engaged with the shallow groove 43, the scraping tine 47 is engaged with the middle groove 42, and the scraping tine 46 is engaged with the deep groove 41.

Figure 30:
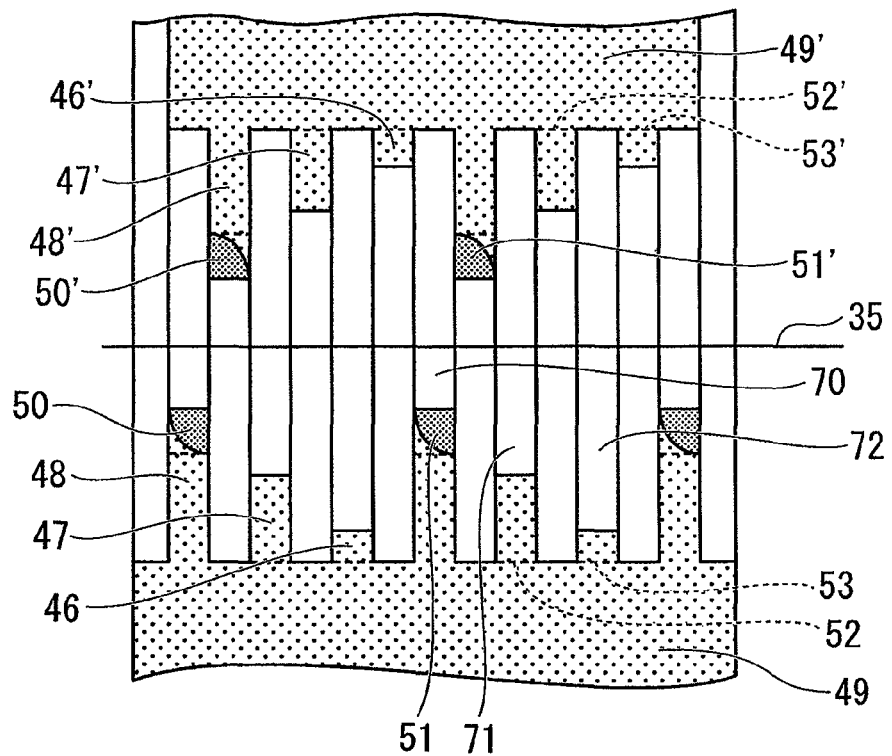
FIG. 30 is a view schematically showing a state where the cutting blade rolls shown in FIG. 28 is engaged with the noodle scraper shown in FIG. 29, and is a bottom view from a bottom face side showing the apparatus for cutting and ejecting noodles.

FIG. 30 is a view schematically showing a state where the cutting blade rolls 44 and 44' shown in FIG. 28 are engaged with the noodle scraper 49 shown in FIG. 29, and is a bottom view from a bottom face side showing the apparatus for cutting and ejecting noodles.

As shown in FIG. 30, the short scraping tines 46 are engaged with (fitted into) the deep grooves 41, the middle scraping tines 47 are engaged with (fitted into) the middle grooves 42, and the long scraping tines 48 are engaged with (fitted into) the shallow grooves 43.

Consequently, the noodle scrapers 49 are 49' are engaged with the cutting blade rolls 44 and 44', respectively.

Figure 31:
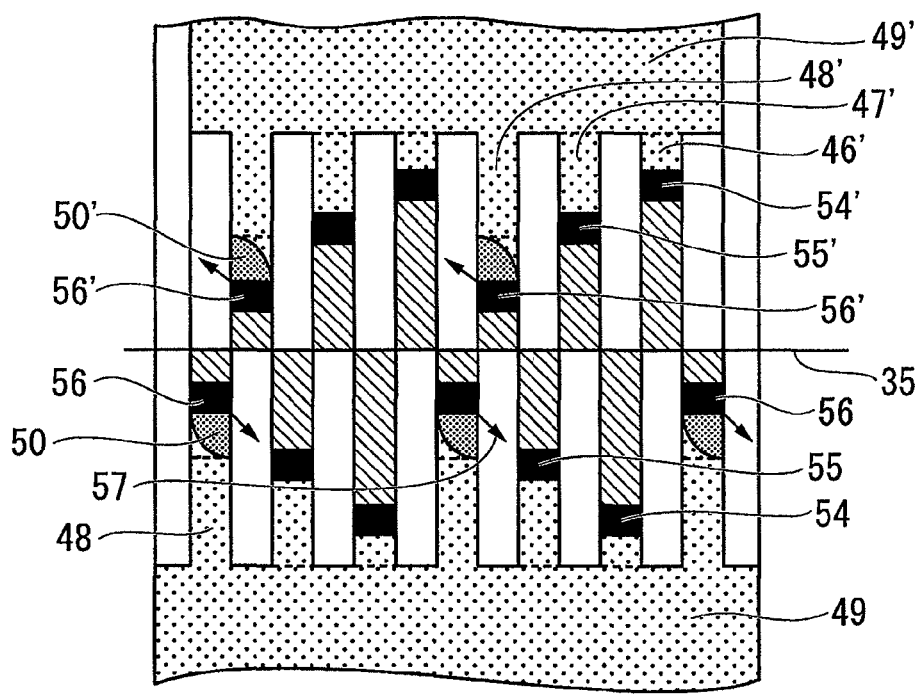
FIG. 31 is a schematic view illustrating a state where the noodles are cut by and ejected from the apparatus for cutting and ejecting noodles shown in FIG. 30, and is a bottom view from a bottom face side showing the apparatus for cutting and ejecting noodles.

FIG. 31 is a view illustrating a state where the noodles are cut by and ejected from the apparatus for cutting and ejecting noodles shown in FIG. 30 (a state where the noodles are separated from each other and a state where the noodles are peeled and removed), and is a bottom view from a bottom face side showing the apparatus for cutting and ejecting noodles.

As shown in FIGS. 30 and 31, folded portions 51 and 51' and sloped faces 50 and 50' are formed at a tine-edge section of the long scraping tine 48 and 48'.

Next, a case where the noodles are cut and ejected by use of the cutting blade rolls 44 and 44' and the noodle scrapers 49 are 49' having the foregoing structure will be described.

Firstly, the noodle band inserted between the cutting blade rolls 44 and 44' is cut and ejected as the plurality of noodles while being pushed into the groove sections 41, 42, and 43 along with the rotation of the cutting blade rolls 44 and 44'.

Each of the plurality of noodles move to a bottom of the cutting blade rolls 44 and 44' along with the rotation of the cutting blade rolls 44 and 44' in a state where the noodles are pushed into the groove sections 41, 42, and 43.

As described above, since the scraping tines 46, 47, and 48 are engaged with the groove sections 41, 42, and 43, respectively, the noodles collide with the scraping tines 46, 47, and 48 and are thereby peeled.

In this way, the noodles 54, 55, and 56 that are peeled from the cutting blade rolls 44 and 44' and separated from each other are obtained.

As described above, since the noodle scraper 49 is constituted of the scraping tines having three tine-lengths that are short, middle, and long, it is possible to cut and eject the noodles from a front position, a middle position, and a rear position in the circumferential direction of the cutting blade rolls in one of the cutting blade rolls.

That is, the noodle groups that are constituted of three rows (three groups and three steps) are cut and ejected in a separated manner in one of the cutting blade rolls.

The noodle groups constituted of the foregoing three rows form rows extending in the axial direction of the cutting blade rolls.

Consequently, the portions at which the noodles are joined to and adhered to each other in adjacent noodles are further distributed, and it is possible to reduce a contact area.

In each row of the noodle groups, the distance between adjacent noodles is the width corresponding to five groove sections (41, 42, and 43).

Therefore, in each row, since the plurality of noodles are distantly-separated from each other by the width of the five groove sections, the number of contact points of noodles is reduced, adjacent noodles are prevented from being joined to and adhered to each other.

In addition, the noodles 56 that were cut by and ejected from the shallow grooves 43 are peeled in the direction indicated by reference numeral 57 of FIG. 31 by a sloped face 50 provided at the scraping tine 48 corresponding to the shallow groove 43.

That is, due to the sloped face 50, the scraping direction of the noodles 56 is converted from the rotation direction of the cutting blade roll into the direction indicated by reference numeral 57.

For this reason, the noodles 56 fall in a spiral manner shown in FIG. 20 after the noodles 56 are peeled from the shallow grooves 43.

In addition, as described above, the noodles 56 are guided by the guide plate provided under the cutting blade roll, and stacked in layers on the guide plate, In addition, the noodles 56 are transported by the noodle feeding conveyer in a state where the noodles 56 are stacked in layers.

As a result, in a state where the noodles are stacked in layers, the number of portions at which the noodles are adhered due to intersection of the noodles dramatically decreases, and the density of noodles decreases.

Because of this, it is possible to considerably reduce the number of times or the number of portions where the plurality of noodles are joined to and adhered to each other, or the number of times or the number of portions where the plurality of noodles layers are joined to and adhered to each other in each noodle group.

In addition, as shown in FIG. 31, three groups of the noodles are obtained from one of the cutting blade rolls, that is, six groups of the noodles are obtained from two of the cutting blade rolls.

Two rows that are the noodle groups 56 and 56' stacked in layers while falling in a spiral manner are positioned as central two rows of six rows noodle groups.

Therefore, when six rows of noodle groups reach the guide plate 9 as shown in FIG. 1, six rows of the noodle groups becomes six layers of noodle groups, slide on the guide plate 9, and are transported to a steaming-boiling process apparatus by the noodle feeding conveyer 8.

Here, in six layers of the noodle groups that land on the noodle feeding conveyer 8, two layers corresponding to center portions are noodle groups 56 and 56' that are stacked in layers while falling in a spiral manner.

Therefore, in the noodle groups 56 and 56', since the density of noodles decreases, the moisture vapor smoothly flows between the six layers of the noodle groups, and the problems of steaming-boiling defects or the like are solved in the center sections.

Modified Example of Second Embodiment

Figure 32:
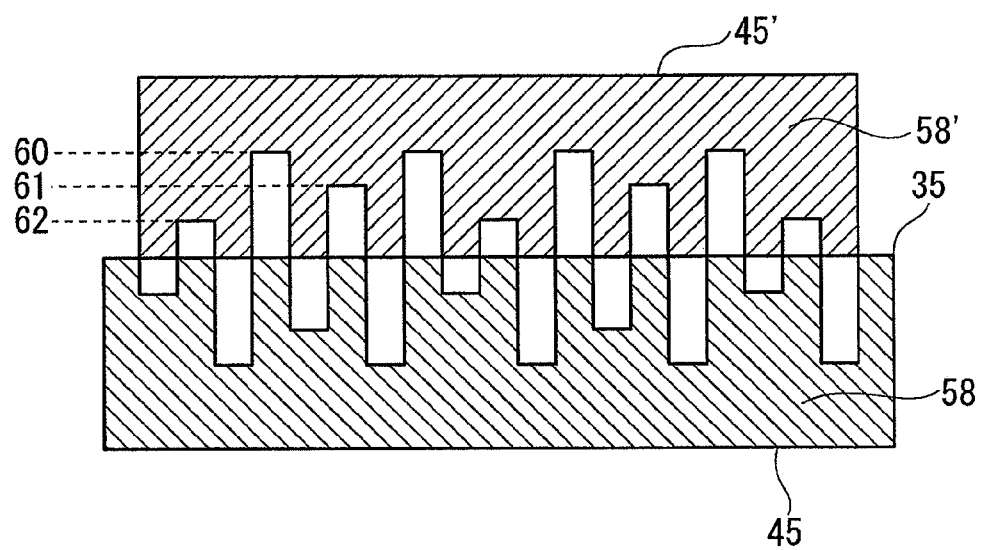
FIG. 32 is a cross-sectional view schematically showing a modified example of cutting blade rolls that have three depths and are employed in the apparatus for cutting and ejecting noodles related to the present invention, and is a vertical cross-sectional view showing the cutting blade rolls in the axial line.

FIG. 32 is a cross-sectional view schematically showing a modified example of cutting blade rolls that have three depths, and is a vertical cross-sectional view showing the cutting blade rolls in the axial line.

The above-described second embodiment shows a structure in which the groove sections 41, 42, and 43 are arrayed so that the depths thereof increases in order along the axial direction of the cutting blade rolls.

In contrast, FIG. 32 shows cutting blade rolls 58 and 58' in which an arrangement of three different depths of groove sections are different from that of the second embodiment.

Figure 33:
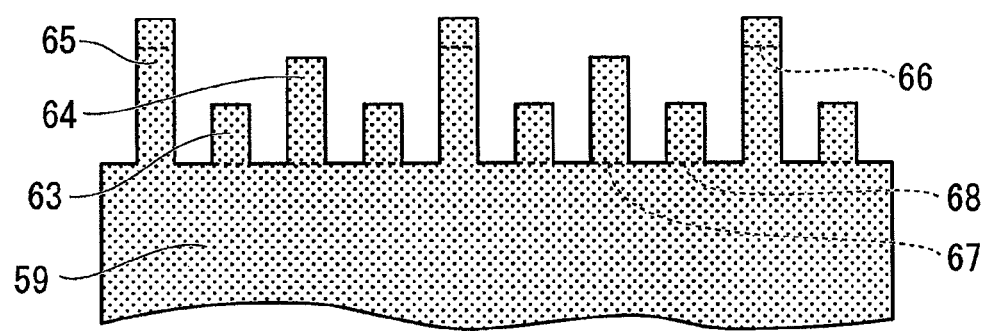
FIG. 33 is a view showing a noodle scraper related to the present invention, and is a plan view schematically showing the noodle scraper having the scraping tines engaged with the cutting blade rolls shown in FIG. 32.

FIG. 33 is a plan view schematically showing a noodle scraper 56 having the scraping tines engaged with the cutting blade rolls shown in FIG. 32.

Figure 34:
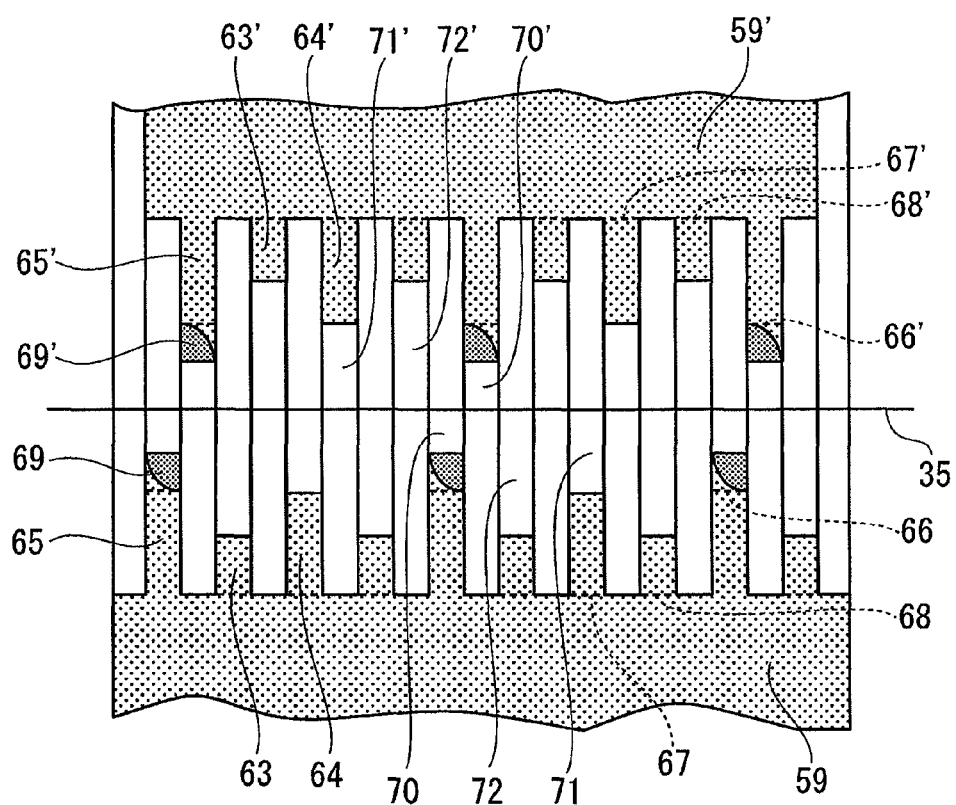
FIG. 34 is a view schematically showing a state where the cutting blade rolls shown in FIG. 32 are engaged with the noodle scraper shown in FIG. 33, and is a bottom view from a bottom face side showing the apparatus for cutting and ejecting noodles.

FIG. 34 is a view schematically showing a state where the cutting blade rolls 58 and 58' shown in FIG. 32 are engaged with the noodle scraper 59 shown in FIG. 33, and is a bottom view from a bottom face side showing the apparatus for cutting and ejecting noodles.

As shown in FIG. 34, the short scraping tines 63 (second scraping tine) are engaged with (fitted into) the deep grooves 60 (second groove section, toroidal-groove sections), the middle scraping tines 64 (third scraping tine) are engaged with (fitted into) the middle grooves 61 (third groove section, toroidal-groove sections), and the long scraping tines 65 (first scraping tine) are engaged with (fitted into) the shallow grooves 62 (first groove section, toroidal-groove sections).

Consequently, the noodle scrapers 59 and 59' are engaged with the cutting blade rolls 58 and 58', respectively.

Since the groove section and the array of the scraping tines shown in FIG. 34 are constituted of the scraping tine having three tine-lengths that are short, middle, and long, it is possible to cut and eject the noodles from the front positions, the middle positions, and the rear position in the circumferential direction of the cutting blade rolls in one of the cutting blade rolls.

That is, the noodle groups of three rows (three groups, three steps) are cut and ejected so as to be separated from each other in one of the cutting blade rolls.

The foregoing noodle groups constituted of three rows form rows extending the axial direction of the cutting blade rolls.

In terms of separating the noodle groups of three rows from each other as mentioned above, the same actions occurs and the same effects are obtained, as the method of using the noodle scraper 49 shown in FIG. 29.

Additionally, in this modified example, an effect different from the method shown in FIG. 29 is obtained as described below.

That is, in one row of the noodle group that are cut by and ejected from the plurality of shallow grooves 62, the distance between the noodles that are adjacent to each other corresponds to the width of seven groove sections (60, 61, and 62), and the plurality of noodles are separated from each other by the width of the seven groove sections.

In addition, also, in one row of the noodle group that is cut by and ejected from the plurality of middle grooves 61, the plurality of noodles are separated from each other by the distance corresponding to the width of the seven groove sections in a manner similar to the shallow grooves 62.

Therefore, in each row, since the plurality of noodles are separated from each other by the width of the seven groove sections, the number of contact points of the noodles decreases, and adjacent noodles are prevented from being joined to and adhered to each other.

In addition, the number of contact points of the noodles that are adjacent to each other decreases, and it is possible to prevent the noodles from being adhered to and agglutinated to each other in a steaming-boiling step.

In addition, in the case where a sloped face 69 is formed at a folded portion 66 of a long scraping tine 65 in a similar manner to the noodle scraper shown in FIG. 29, the noodles that are peeled by the scraping tine 65 are removed along the sloped face 69, the removing direction is converted into an oblique direction, and it is possible for the noodles to fall in a spiral manner.

The plurality of noodle groups that are cut and ejected by the apparatus for cutting and ejecting noodles in the example are transported to an apparatus in which a steaming-boiling process is performed in a state where the noodles are stacked in layers as described above.

Here, the two layers corresponding to the center portions of the layered structure constituted of total six layers are the noodle groups that are stacked in layers while being dropped from the cutting blade rolls in a spiral manner after being peeled by the sloped face.

In addition, the noodle group of the two layers positioned at an upper-layer side of the center portions and the noodle group of the two layers positioned at a lower-layer side of the center portions are the noodle groups in which the number of joint points or adhesion points of adjacent noodles decreases, which are stacked in layers and disposed while being in a wavy manner.

Consequently, it is possible to further reduce the number of portions at which the noodle layers are adhered to or agglutinated to each other in the plurality of noodles that are adjacent to each other.

For this reason, it is possible to produce a noodle agglomeration in which the noodle layers are prevented from being adhered to or agglutinated to each other.

The present invention obtains an action and effect by the above-described structure.

As long as the above-described action and effect are obtained, the technical scope of the present invention is not limited to the above embodiments, but various modifications may be made without departing from the scope of the present invention.

Namely, in the apparatus for cutting and ejecting noodles related to the present invention, each of the constituent elements may be modified or adjusted as required.

For example, in the cutting blade rolls in the present invention, the toroidal-groove sections are the groove sections having the two depths that are constituted of the deep grooves and the shallow grooves, or the groove sections having the three depths that are constituted of the deep grooves, the middle grooves, and the shallow grooves.

Not only the foregoing toroidal-groove sections, but also the number of steps may increase as needed.

In addition, an arrangement in which the groove sections having the depths are arrayed may be appropriately set.

In the noodle scraper related to the present invention, the tine-lengths of the scraping tine are set to two lengths or three lengths.

Not only the above-described structure, but also the number of lengths may increase as needed.

It is not necessary for the number of tine-lengths of the scraping tine to coincide with steps of the groove section of the cutting blade rolls.

For example, a combination of the depths of the toroidal-groove sections being set as two depths with the tine-lengths of the plurality of scraping tines in the noodle scraper being set as three may be applied.

In addition, other combinations may be applied as needed.

In addition, the sloped face is formed on the folded portion or the curved portion in the scraping tines of the noodle scraper related to the present invention.

In the above-described embodiment, the sloped face inclined along the direction identical to the direction of the scraping tines array that are consecutively arrayed on the noodle scraper is described; however, the structure of the sloped face of the present invention is not limited to the structure described in the above-described embodiment.

As a structure of the sloped face, for example, a structure in which sloped directions are alternately modified, or a structure in which the sloped directions are modified in order of appropriate arrangement as needed may be applied.

However, in order to prevent the plurality of noodles that were cut by and ejected from the cutting blade rolls and peeled by the scraping tine, from colliding with each other, from being interfered with each other, and from being adhered to each other, it is necessary for each of the plurality of peeled noodles to smoothly fall from the cutting blade rolls in a spiral manner.

In order to obtain the foregoing noodles formed as a spiral shape, it is desirable that the directions of the sloped faces that are provided at the scraper all be the same.

In addition, in the apparatus for cutting and ejecting noodles of the above-described embodiment, as shown in FIGS. 7 and 31, the noodles are cut by and ejected from each of the pair of cutting blade rolls in different directions.

Specifically, as shown in FIG. 7, the noodles are peeled from the noodle scraper 21 in the direction indicated by reference numeral 36, and the noodles are peeled from the noodle scraper 21' in the direction indicated by reference numeral 36'.

Namely, the directions indicated by reference numerals 36 and 36' are different from each other, and the noodles are peeled along the directions indicated.

In addition, in FIG. 31, in a similar manner, the scraping direction of the noodles peeled by the noodle scraper 49 and the scraping direction of the noodles peeled by the noodle scraper 49' are different from each other.

In order to scrape the noodles in a manner that the scraping directions are different from each other as mentioned above, the sloped faces are arrayed in the noodle scraper.

The present invention is not limited to the arrangement of sloped faces provided at the noodle scraper as described above.

For example, in explanation with reference to FIG. 7, the sloped faces may be arrayed on the noodle scrapers 21 and 21' such that the scraping direction of the noodles peeled by the noodle scraper 21 is the same as the scraping direction of the noodles peeled by the noodle scraper 21'.

However, in order to avoid the plurality of noodles that are peeled from the sloped face of each noodle scraper from colliding with each other or from being interfered with or adhered to each other, it is necessary for each of the plurality of peeled noodles to smoothly fall from the cutting blade rolls in a spiral manner.

In order to obtain the foregoing noodles formed as a spiral shape, it is desirable that the sloped face be formed at the scraping tine of the noodle scraper as shown in FIGS. 7 and 31.

Consequently, it is possible to promptly separate and remove the noodles that were peeled by the noodle scraper from each other in each of directions that are opposite to each other.

In addition, in order for the noodles peeled by the scraping tine to fall in a spiral manner, it is preferable that the sloped face that is formed at the folded portion of the scraping tine or the curved portion be formed at the scraping tine having the longest tine-length.

The present invention is not limited to a constitution in which the sloped face is only formed at the long scraping tine.

For example, a constitution in which the sloped face is formed at the scraping tine having the tine-length that is shorter than the long scraping tine may be applied.

In addition, in the short scraping tine or the middle scraping tine, the sloped face may be formed at the folded portion or the curved portion.

In addition, in the long scraping tines, the middle scraping tines, and the short scraping tines, the tine-edge section that are constituted of a combination of the folded portion, the curved portion, with the sloped face may be formed.

In addition, in the long scraping tines, the middle scraping tines, and the short scraping tines, the scraping tine at which the sloped face as needed is formed may be optionally selected.

The structure in which the sloped face is provided at the scraping tine as mentioned above is adequately adjusted, selected, and set in accordance with a frequency of adherence or agglutination in which the noodle groups are stacked in layers.

Specifically, in order to increase the frequency of adherence or agglutination of the noodles in a steaming-boiling process, or in order to solve the adherence of the noodles of products, the structure in which the sloped face is provided at the scraping tine is adequately adjusted.

Furthermore, in order to solve the adherence in which the plurality of noodles that were restored to original state after cooking are adhered to each other, or in accordance with the purpose for improving the condition of ravel in the noodles, the structure in which the sloped face is provided at the scraping tine is adequately controlled in view of the effects of the present invention.

INDUSTRIAL APPLICABILITY

In both the apparatus for cutting and ejecting noodles and the noodle scraper related to the present invention, when the noodles that are necessary to be subjected to a steaming-boiling process are continuously produced, it is possible to produce the noodle agglomeration as a finished product in which the frequency of adhesion and agglutination of the noodles is extremely suppressed.

Moreover, in both the apparatus for cutting and ejecting noodles and the noodle scraper related to the present invention, the problem such that the defect of ravel is solved, and it is possible to provide the noodles products in which quality of goods is improved.

In addition, in both the apparatus for cutting and ejecting noodles and the noodle scraper related to the present invention, a bent condition of the noodles is absorbed before performing a steaming-boiling process, and the noodles that are stacked in layers are in contact at points.

Since the noodle structure caused by point contacting as remarked above is obtained, when the noodle structure is cooked, it is possible to promptly restore the noodle structure to linear noodles so as to have the same configuration as the noodles that are cut by and ejected from the cutting blade rolls.

Therefore, it is possible to realize a continuous quantity production of a buckwheat noodle, a wheat noodle, and the like which are typically linear, and to provide noodles products such that a buckwheat noodle and a wheat noodle having typical and natural shape for tasting.

In addition, both the apparatus for cutting and ejecting noodles and the noodle scraper related to the present invention, it is possible to absorb the bent shape of the noodles that are cut by and ejected from the cutting blade rolls, to deposit (stack in layers) the noodles that are adjacent to each other while being in point contact, and to decrease the number of portions at which adjacent noodles are adhered to each other.

Because of this, not only a noodle production in which a steaming-boiling process is necessary, but also a noodle production for raw noodle products that are not steamed and boiled or for noodle products that are performed to a heat-treatment such as a boiling process or the like, the present invention can be applied.

What is claimed is:

1. A noodle scraper comprising:
a plate body having a bent section extending along a longitudinal direction;
a plurality of first scraping tines having a longest tine-length; and
a plurality of second scraping tines having a tine-length which is shorter than that of the first scraping tine, wherein
the plurality of first scraping tines and the plurality of second scraping tines are alternately provided at one of long sides of the plate body in a comb form;
the second scraping tine includes a tine-base section or a tine-middle section; and
the tine-base section or the tine-middle section is formed in a folded shape or a curved shape, wherein
a tine-edge section of the first scraping tine or a tine-edge section of the second scraping tine includes a recess that extends perpendicular to a longitudinal axis of the tine, wherein the recess comprises a sloped face on a side along a direction in which the tine-edge section extends toward a free end thereof.

2. The noodle scraper according to claim 1, wherein
a tine-edge section of the first scraping tine is formed in a folded shape or a curved shape.

3. The noodle scraper according to claim 1, wherein
the sloped face has at least one of a single plane, a combined face, a curved surface at which a concave groove is formed, and a curved surface in which a groove having a spherical surface is formed.

4. A noodle scraper comprising:
a plate body having a bent section extending along a longitudinal direction;
a plurality of first scraping tines having a longest tine-length;
a plurality of second scraping tines having a tine-length which is shorter than that of the first scraping tine; and
a plurality of third scraping tine having a tine-length which is shorter than that of the first scraping tine and is longer than that of the second scraping tine, wherein
the plurality of first scraping tines, the plurality of second scraping tines, and the plurality of third scraping tines are alternately provided at one of long sides of the plate body in a comb form;
the second scraping tine and the third scraping tine include a tine-base section or a tine-middle section; and
the tine-base section or the tine-middle section is formed in a folded shape or a curved shape, wherein
a tine-edge section of the first scraping tine, a tine-edge section of the second scraping tine, or a tine-edge section of the third scraping tine includes a recess that extends perpendicular to a longitudinal axis of the tine, wherein the recess comprises a sloped face on a side along a direction in which the tine-edge section extends toward a free end thereof.

5. The noodle scraper according to claim 4, wherein
the sloped face has at least one of a single plane, a combined face, a curved surface at which a concave groove is formed, and a curved surface in which a groove having a spherical surface is formed.

6. The noodle scraper according to claim 4, wherein
the plurality of first scraping tines, the plurality of second scraping tines, and the plurality of third scraping tines are arrayed in an order of decreasing tine-lengths; and
only a tine-edge section of the first scraping tine, or a tine-edge section of the first scraping tine and the third scraping tine is formed in a folded shape or a curved shape.

* * * * *